(12) United States Patent
Kurokawa et al.

(10) Patent No.: US 11,338,839 B2
(45) Date of Patent: May 24, 2022

(54) ELECTRICALLY ADJUSTABLE STEERING

(71) Applicant: NSK LTD., Tokyo (JP)

(72) Inventors: Yoshifumi Kurokawa, Ann Arbor, MI (US); Simon Read, Ann Arbor, MI (US); Steven Marmillo, North Bennington, VT (US)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/082,501

(22) Filed: Oct. 28, 2020

(65) Prior Publication Data

US 2021/0171086 A1 Jun. 10, 2021

Related U.S. Application Data

(60) Provisional application No. 62/927,810, filed on Oct. 30, 2019.

(51) Int. Cl.
*B62D 1/181* (2006.01)
*B62D 1/183* (2006.01)
(Continued)

(52) U.S. Cl.
CPC ............. *B62D 1/181* (2013.01); *B60Q 9/00* (2013.01); *B62D 1/04* (2013.01); *B62D 1/183* (2013.01);
(Continued)

(58) Field of Classification Search
CPC ........ B62D 1/181; B62D 1/183; B62D 1/187; B62D 1/189; B62D 1/04; B60Q 9/00; B60Q 5/005; H02P 6/08; H02P 7/03
See application file for complete search history.

(56) References Cited

U.S. PATENT DOCUMENTS

| 5,178,411 A | * | 1/1993 | Fevre .................. | B62D 1/181 |
| | | | | 280/775 |
| 2016/0121918 A1 | * | 5/2016 | Soderlind ............ | B62D 1/197 |
| | | | | 74/493 |

(Continued)

FOREIGN PATENT DOCUMENTS

| CN | 112298329 A | * | 2/2021 | ............. B62D 1/181 |
| DE | 4112048 A1 | * | 10/1991 | ............. B62D 1/181 |

(Continued)

OTHER PUBLICATIONS

Sushita, Electric Vehicle Adjusting Device, Feb. 9, 2017, EPO, WO 2017022205 A1, Machine Translation of Description (Year: 2017).*

(Continued)

*Primary Examiner* — James A English
*Assistant Examiner* — Matthew D Lee
(74) *Attorney, Agent, or Firm* — Sughrue Mion, PLLC

(57) ABSTRACT

The position adjustment mechanism is configured to perform a storage operation of storing the steering wheel in a storage position to secure a space in a driver seat for a driver and an adjustment operation of adjusting the steering wheel to a position suitable for driving within an adjustment operation range. The motor control unit is configured to drive the electric motor such that a speed of the steering wheel during the storage operation is higher than a speed of the steering wheel during the adjustment operation.

10 Claims, 31 Drawing Sheets

(51) Int. Cl.
*B62D 1/189* (2006.01)
*B60Q 9/00* (2006.01)
*H02P 6/08* (2016.01)
*B62D 1/04* (2006.01)
*B60Q 5/00* (2006.01)

(52) U.S. Cl.
CPC ............... *B62D 1/189* (2013.01); *H02P 6/08* (2013.01); *B60Q 5/005* (2013.01)

(56) References Cited

U.S. PATENT DOCUMENTS

| | | | |
|---|---|---|---|
| 2018/0244174 A1* | 8/2018 | Tan | B60N 2/22 |
| 2021/0078625 A1* | 3/2021 | Yamazaki | B62D 1/183 |
| 2021/0080949 A1* | 3/2021 | Takeda | B60W 60/0053 |
| 2021/0213997 A1* | 7/2021 | Watanabe | B62D 6/00 |

FOREIGN PATENT DOCUMENTS

| | | | | |
|---|---|---|---|---|
| EP | 1927526 A1 | * | 6/2008 | ............. B62D 1/181 |
| JP | 1-195173 A | | 8/1989 | |
| JP | 2007106266 A | * | 4/2007 | |
| JP | 2008137449 A | * | 6/2008 | |
| WO | WO-2017022205 A1 | * | 2/2017 | ............. B60R 16/02 |
| WO | WO-2019005736 A1 | * | 1/2019 | ............. B62D 25/14 |

OTHER PUBLICATIONS

Fukuhara , Electric Steering Device, Apr. 26, 2007, EPO, JP 2007106266 A, Machine Translation of Description (Year: 2007).*

Pulse Width Modulation, [retrieved on Nov. 24, 2021], Retrieved from the Internet, WaybackMachine on Mar. 15, 2015; <https://web.archive.org/web/20150315050928/https://www.electronics-tutorials.ws/blog/pulse-width-modulation.html>. (Year: 2015).*

* cited by examiner

ELECTRICALLY ADJUSTABLE STEERING

CROSS-REFERENCE TO RELATED APPLICATIONS

The present application is based on U.S. Provisional Patent Application No. 62/927,810 filed on Oct. 30, 2019, the contents of which are incorporated by reference herein.

TECHNICAL FIELD

The present invention relates to an electrically adjustable steering.

BACKGROUND ART

In related art, an electrically adjustable steering which has a function of adjusting a position of a steering wheel to a position that is easy for a driver to drive is known. There is also known an electrically adjustable steering which has a function of retracting a steering wheel from a normal position when a driver enters or exits such that the driver can easily enter and exit.

For example, an electrically adjustable steering disclosed in JP-A-H1-195173 includes a tilt steering mechanism in which a steering shaft is driven up and down by a drive source. The electrically adjustable steering includes two operation modes, namely, an auto mode in which the steering shaft is automatically moved up and down relative to entrance and exit of a driver, and a manual operation mode in which the steering shaft is adjusted to a desired tilt position by an operation of the driver.

In the electrically adjustable steering which has the function of retracting the steering wheel from the normal position when the driver enters or exits, it is required to quickly secure a space of a driver seat for the driver.

An object of the present application is to provide an electrically adjustable steering capable of quickly securing the space of the driver seat for the driver.

SUMMARY OF INVENTION

The object of the present invention is achieved by the following configuration.

An electrically adjustable steering comprising:
a steering mechanism in which a steering wheel is mounted;
a position adjustment mechanism which includes an electric motor configured to adjust a telescopic position and a tilt position of the steering wheel; and
a motor control unit configured to control driving of the electric motor,
wherein the position adjustment mechanism is configured to perform a storage operation of storing the steering wheel in a storage position to secure a space for a driver and an adjustment operation of adjusting the steering wheel to a position suitable for driving within an adjustment operation range, and
the motor control unit is configured to drive the electric motor such that a speed of the steering wheel during the storage operation is higher than a speed of the steering wheel during the adjustment operation.

According to the present invention, the electrically adjustable steering capable of quickly securing the space of the driver seat for the driver can be provided.

DESCRIPTION OF EMBODIMENTS

Hereinafter, embodiments of the present invention will be described with reference to the drawings.

Figure 1:
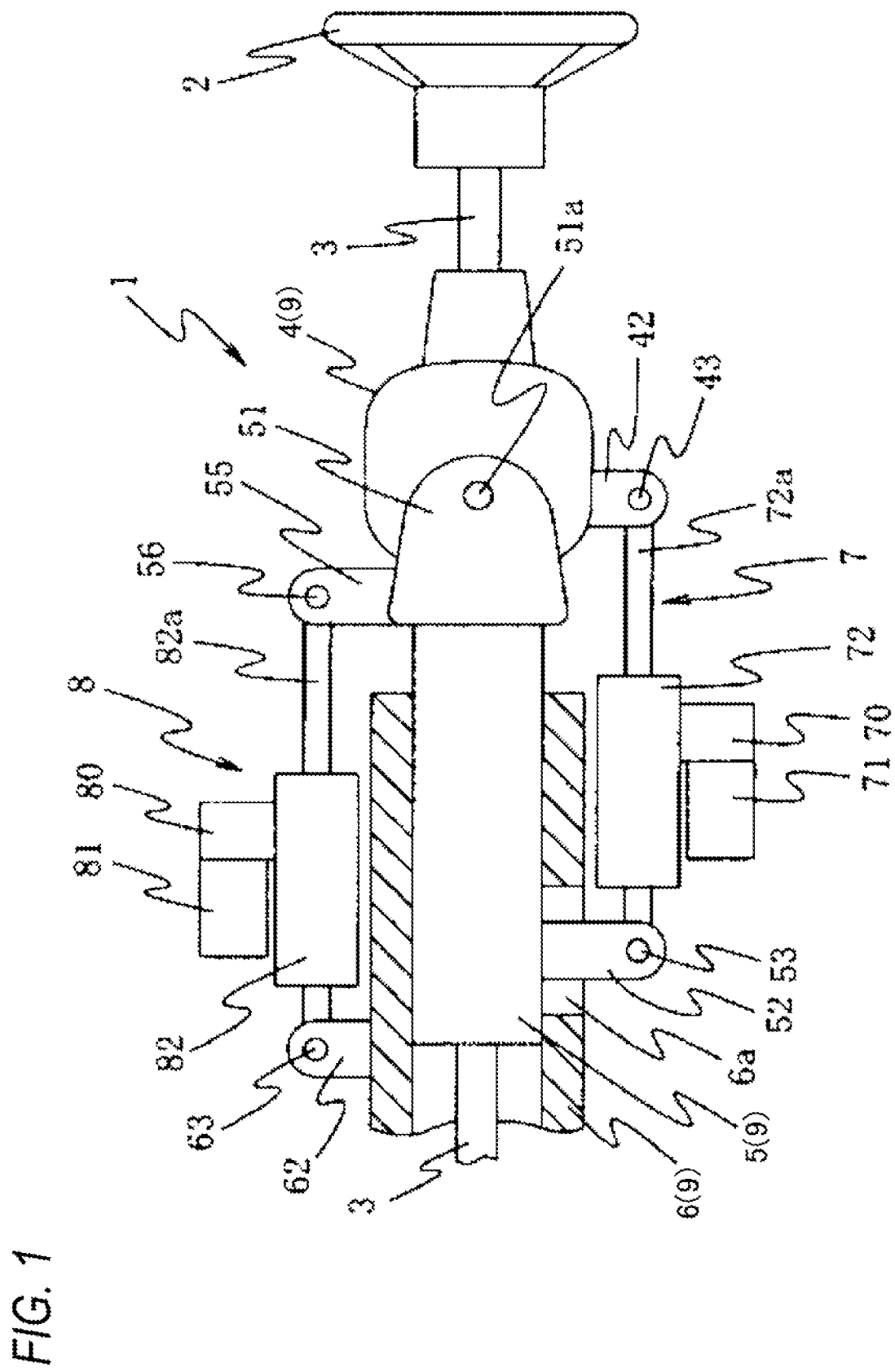
FIG. 1 is a schematic view of an electrically adjustable steering.

FIG. 1 is a schematic view of an electrically adjustable steering 1 according to an embodiment of the present invention. The electrically adjustable steering 1 adopts a type (so-called head swing tilt type) in which a column has a swing center (tilt hinge pin 51a to be described later below) on a side close to a steering wheel. The electrically adjustable steering 1 of the present invention is not limited to adopt the head swing tilt type, and a type (so-called waist swing tilt type) in which a column has a swing center on a side far from a steering wheel, or any other type may be adopted.

Figure 31:
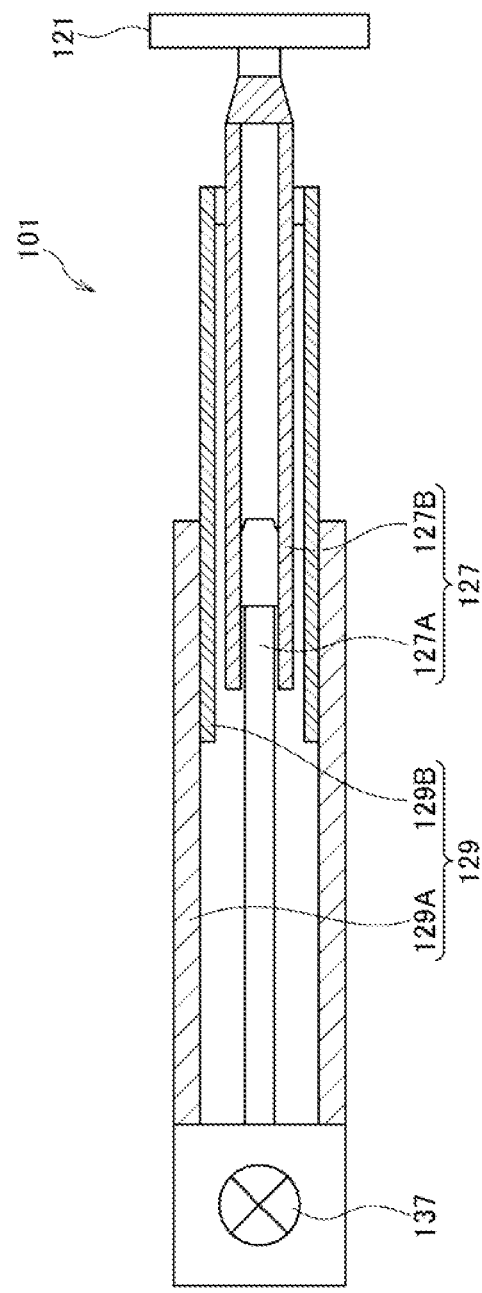
FIG. 31 is a schematic view of a waist swing tilt type electrically adjustable steering.

As shown in FIG. 31, a waist swing tilt type electrically adjustable steering 101 includes a steering wheel 121, a steering shaft 127 connected to the steering wheel 121, and a steering column 129 through which the steering shaft 127 is inserted.

The steering shaft 127 includes an inner shaft 127A and an outer shaft 127B. The inner shaft 127A and the outer shaft 127B are serration-fitted, and are combined in a manner that allows freely transmission of rotational torque and allows relative displacement with respect to an axial direction.

The cylindrical steering column 129 through which the steering shaft 127 is inserted includes an outer column 129A and an inner column 129B. The outer column 129A and the inner column 129B are combined in a manner that allows a telescopic movement.

The electrically adjustable steering 101 includes a tilt hinge pin 137 that fixes the steering wheel 121, the steering shaft 127, and the steering column 129 integrally to a vehicle in a manner that allows tilt movement. The tilt hinge pin 137 is fixed to a front end portion of the steering column 129.

A head swing tilt type electrically adjustable steering 1 of FIG. 1 includes three steering columns (an upper column 4, a middle column 5, and a lower column 6) rotatably holding a steering shaft 3, which extends from a steering wheel 2 and is connected to a steering gear (not shown), around an axis thereof. By adjusting relative positions of the columns 4, 5, and 6, the steering shaft 3 and the steering wheel 2 are adjusted to desired positions. Therefore, the three columns 4, 5, and 6 constitute a steering mechanism 9 in which the steering wheel 2 is mounted on a driver seat side.

The upper column 4 accommodates a universal joint (not shown) of the steering shaft 3 in an internal space. The upper column 4 is attached to a fork portion 51 formed at a rear end of the middle column 5 so as to be tiltable via the tilt hinge pin 51a. That is, a tilt position of the steering wheel 2 can be adjusted by appropriately swinging the upper column 4 with the tilt hinge pin 51a serving as a fulcrum.

The middle column 5 is fitted and held in the lower column 6, and is slidable in an axial direction together with the fork portion 51 that supports the upper column 4. That is, by advancing and retracting the middle column 5 relative to the lower column 6 fixed to a vehicle body, the upper column 4 moves together with the steering shaft 3 in an axial direction thereof, and thus a telescopic position of the steering wheel 2 can be adjusted.

A telescopic position and a tilt position of the upper column 4 are adjusted by an electric tilt mechanism 7 and an electric telescopic mechanism 8 which include an electric motor. Therefore, the electric tilt mechanism 7 and the electric telescopic mechanism 8 constitute a position adjustment mechanism including the electric motor that adjusts the telescopic position and the tilt position of the steering wheel 2.

The tilt position of the upper column 4 is adjusted by the electric tilt mechanism 7. The electric tilt mechanism 7 includes, for example, a three-phase brushless motor 71 (electric motor) where a gear box 70 is attached, and a telescopic rod device 72 driven by the brushless motor 71. An actuator rod 72a extending from the telescopic rod device 72 is expanded and contracted in response to rotation of, for example, the three-phase brushless motor 71 which serves as the electric motor.

A front end portion of the telescopic rod device 72 is pivotally attached, by a pin 53, to a bracket 52 which is fixed to the middle column 5, and thus a hinge is formed. A rear end portion of the actuator rod 72a is pivotally attached, by a pin 43, to a bracket 42 which is fixed to the upper column 4, and thus a hinge is formed.

Therefore, if the actuator rod 72a is gradually extended from the telescopic rod device 72, the upper column 4 is smoothly rotated in a counterclockwise direction relative to the middle column 5, and thus the steering wheel 2 can be gradually tilted upward. On the other hand, if the actuator rod 72a is gradually accommodated in the telescopic rod device 72, the upper column 4 is rotated smoothly in a clockwise direction relative to the middle column 5, and thus the steering wheel 2 can be gradually tilted downward.

The telescopic position of the upper column 4 is adjusted by the electric telescopic mechanism 8 which has substantially the same structure as the electric tilt mechanism 7. That is, the electric telescopic mechanism 8 includes, for example, a three-phase brushless motor 81 (electric motor) where a gear box 80 is attached, and a telescopic rod device 82 driven by the brushless motor 81.

A front end portion of the telescopic rod device 82 is pivotally attached, by a pin 63, to a bracket 62 which is fixed to the lower column 6, and thus a hinge is formed. A rear end portion of an actuator rod 82a is pivotally attached, by a pin 56, to a bracket 55 which is fixed to the fork portion 51 of the middle column 5, and thus a hinge is formed.

Therefore, if the actuator rod 82a is extended from the telescopic rod device 82, the middle column 5 is extended from the lower column 6, and thus the steering wheel 2 can be retracted. On the other hand, if the actuator rod 82a is accommodated in the telescopic rod device 82, the middle column 5 is retracted into the lower column 6, and thus the steering wheel 2 can be advanced.

The bracket 52 fixed to the middle column 5 is guided by a groove 6a formed in the lower column 6, and can slide together with the middle column 5 along the axial direction relative to the lower column 6.

Figure 2:
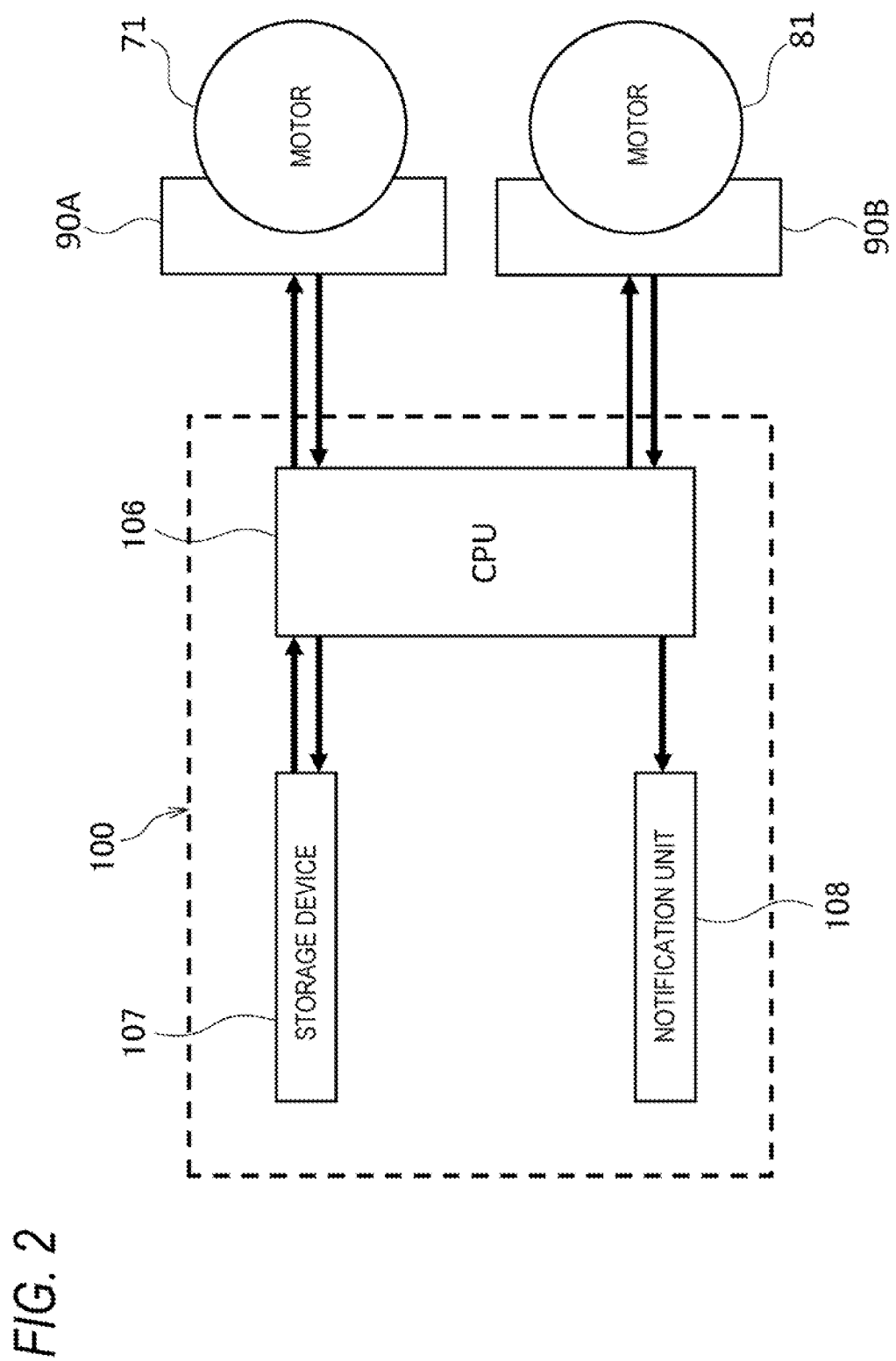
FIG. 2 shows a motor and a motor control unit.

Here, as shown in FIG. 2, the brushless motors 71 and 81 include motor drive circuits 90A and 90B. Various signals are input from a motor control unit 100 to the motor drive circuits 90A and 90B. The brushless motors 71 and 81 are driven and controlled by the motor control unit 100.

The motor control unit 100 includes a central processing unit (CPU) 106 operated by a power supply voltage output from a regulator or battery (not shown), a storage device 107 constituted by a non-volatile memory connected to the central processing unit 106, and a notification unit 108 that notifies a driver of a moving state of the steering wheel 2.

The central processing unit 106 of the motor control unit 100 measures the current tilt position and telescopic position of the steering wheel 2 based on a position detection signal of the electric tilt mechanism 7 and the electric telescopic mechanism 8 input from the motor drive circuits 90A and 90B, and outputs a control signal to the motor drive circuits 90A and 90B. Then the central processing unit 106 controls the brushless motors 71 and 81 to displace the steering wheel 2 in a tilt direction and a telescopic direction, as will be described below.

Figure 3:
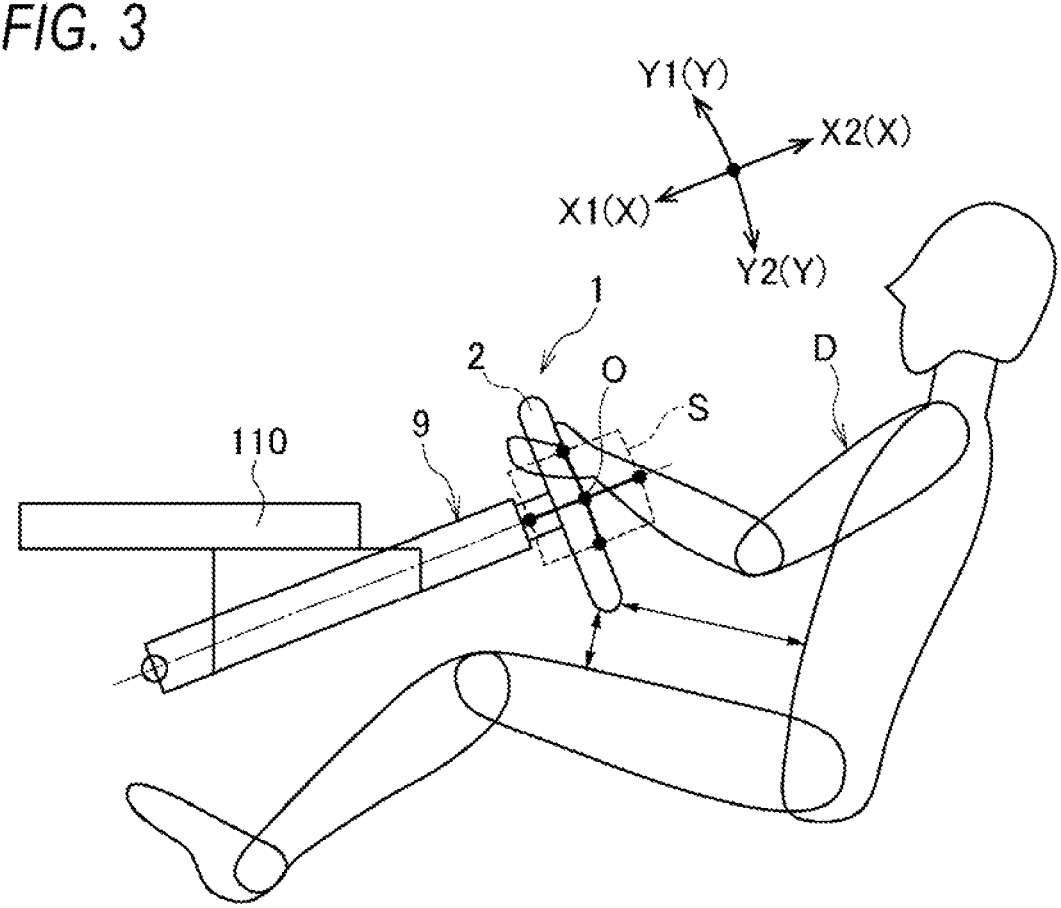
FIG. 3 shows an adjustment operation and a storage operation.

FIG. 3 shows the electrically adjustable steering 1 which is fixed to a vehicle body 110, and a driver D seated in a driver seat (not shown). In FIG. 3, the electrically adjustable steering 1 is shown in a simplified form, and the steering mechanism 9, in which the steering wheel 2 is mounted on a driver seat side, is shown.

The steering wheel 2 can be moved in the tilt direction (up-down direction) by the electric tilt mechanism 7 with an origin O serving as a center, and can be moved in the telescopic direction (front-rear direction) by the electric telescopic mechanism 8. In FIG. 3, the telescopic direction is indicated by X, a front side in the telescopic direction is indicated by X1, while a rear side is indicated by X2. In FIG. 3, the tilt direction is indicated by Y, an upper side in the tilt direction is indicated by Y1, while a lower side is indicated by Y2.

The driver D operates the electric tilt mechanism 7 and the electric telescopic mechanism 8 by operating an operation unit (button, lever, screen, or the like) (not shown), and thus the steering wheel 2 can be adjusted to a driving position that is suitable for driving. Hereinafter, such an operation of adjusting the steering wheel 2 to the driving position that is suitable for driving is referred to as an "adjustment operation". The adjustment operation of the steering wheel 2 is performed within an adjustment operation range S indicated by a dotted line in FIG. 3.

When the driver D enters or exits a vehicle or when the vehicle is automatically driven, it is desirable to secure a wide space around knees of driver D. This is because the knees of the driver D needs to pass under the steering wheel 2 when the driver D enters or exits. Therefore, when the knees are abutted against the steering wheel 2, the driver D may feel difficult to enter or exit. When the vehicle is automatically driven, the driver D may have a feeling of compression depending on a position of the steering wheel 2.

Therefore, in addition to the adjustment operation, the position adjustment mechanism (the electric tilt mechanism 7 and the electric telescopic mechanism 8) can perform a storage operation of storing the steering wheel 2 in a storage position to secure a space in the driver seat for the driver D. The position adjustment mechanism performs the storage operation, for example, during the automatic driving of the vehicle or when the driver enters or exits the vehicle. A range where the storage operation of the steering wheel 2 can be performed may coincide with the adjustment operation range S or may extend to outside of the adjustment operation range S. The latter case is desirable since the steering wheel 2 can be further separated from the driver D in the latter case while the space around the driver D can be secured more widely.

The storage device 107 of the motor control unit 100 stores the tilt position and the telescopic position of the steering wheel 2. The storage device 107 can output a storage position P to the central processing device 106. For example, each time the driver D enters the vehicle and turns on an ignition switch, the brushless motor 71 of the electric tilt mechanism 7 and the brushless motor 81 of the electric telescopic mechanism 8 may be automatically controlled such that the steering wheel 2 is located at the tilt position and the telescopic position stored in the storage device 107, that is, the storage position P stored in the storage device 107.

Figure 4:
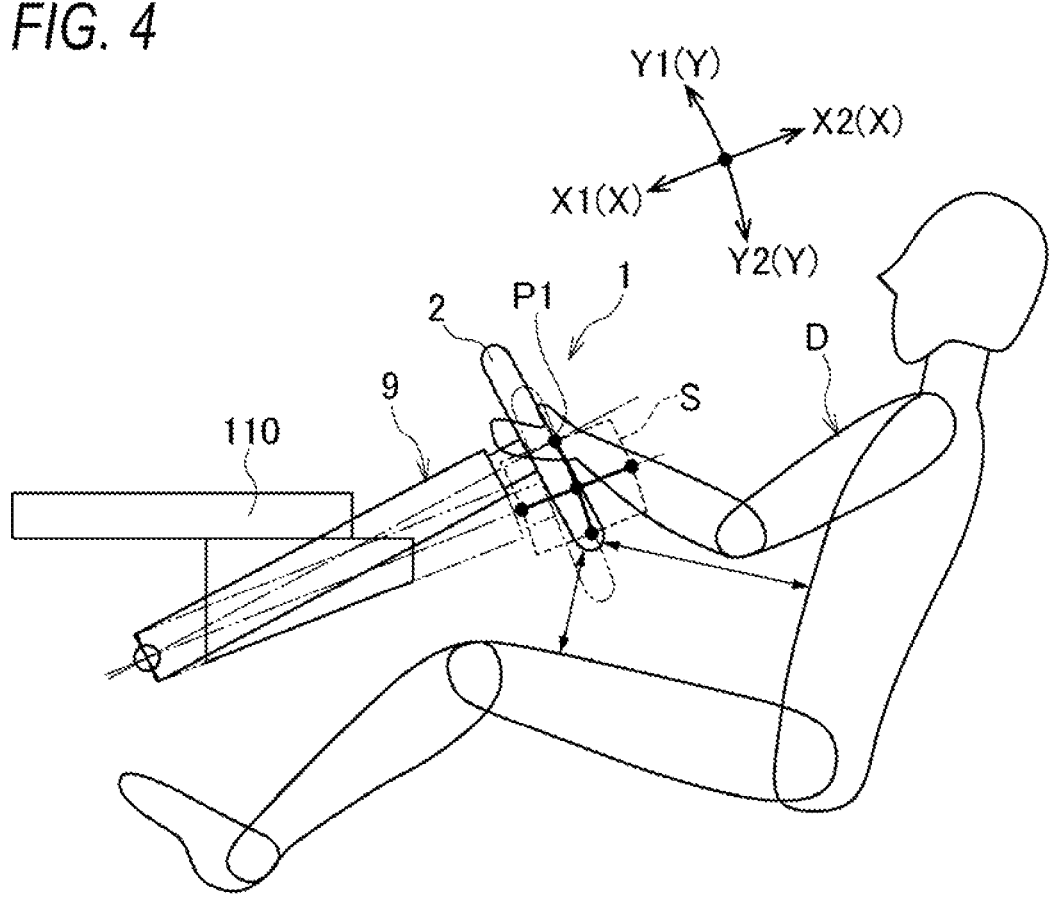
FIG. 4 shows the adjustment operation and the storage operation.

FIG. 4 shows a state where the steering wheel 2 is not moved from the origin O in the telescopic direction X but is moved toward the upper side Y1 in the tilt direction Y and stored in a storage position P1. The storage position P1 is located on an upper edge of the adjustment operation range S. The steering wheel 2 located at the origin O is indicated by a two-dot chain line. In this way, when the steering wheel 2 is moved in the tilt direction Y, the space around the driver D can be more quickly secured, and the driver D can feel that the steering wheel 2 is moving quickly.

Figure 5:
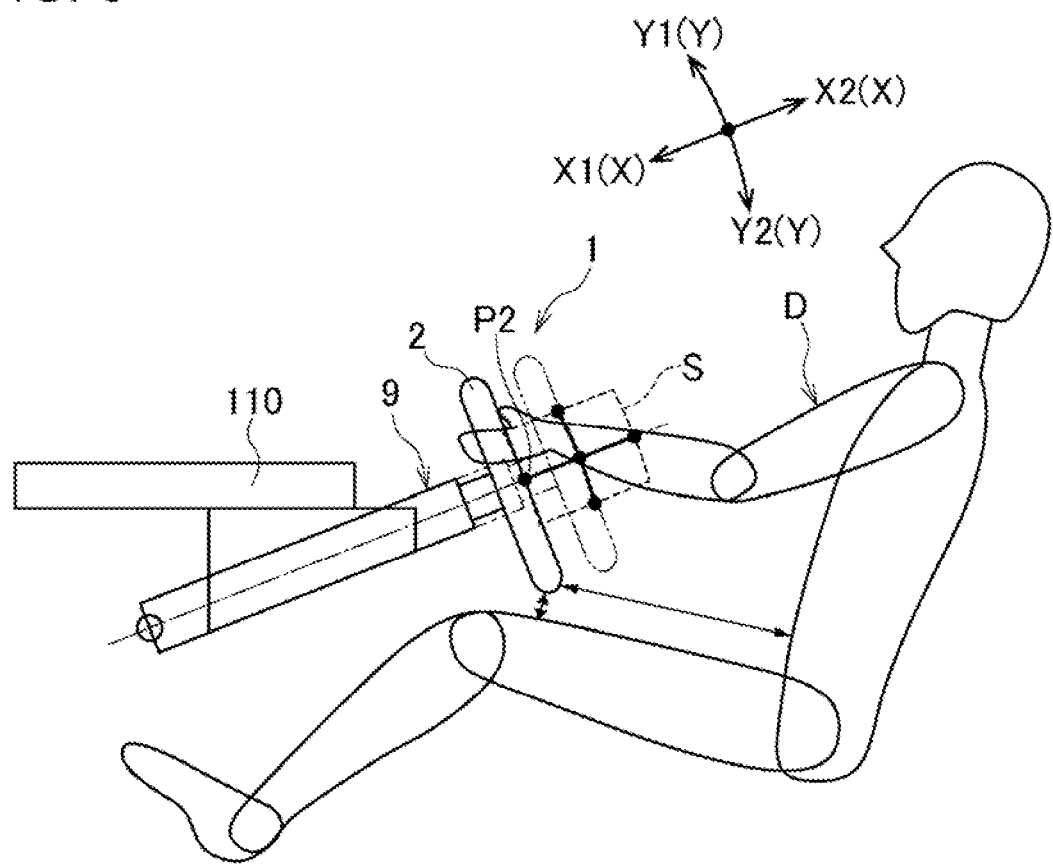
FIG. 5 shows the adjustment operation and the storage operation.

FIG. 5 shows a state where the steering wheel 2 is not moved from the origin O in the tilt direction Y but is moved toward the front side X1 in the telescopic direction X and stored in a storage position P2. The storage position P2 is located on a front edge of the adjustment operation range S. The steering wheel 2 located at the origin O is indicated by the two-dot chain line. In this way, when the steering wheel 2 is moved in the telescopic direction X, the driver D feels that movement of the steering wheel 2 is small and the steering wheel 2 is moving slowly.

Figure 6:
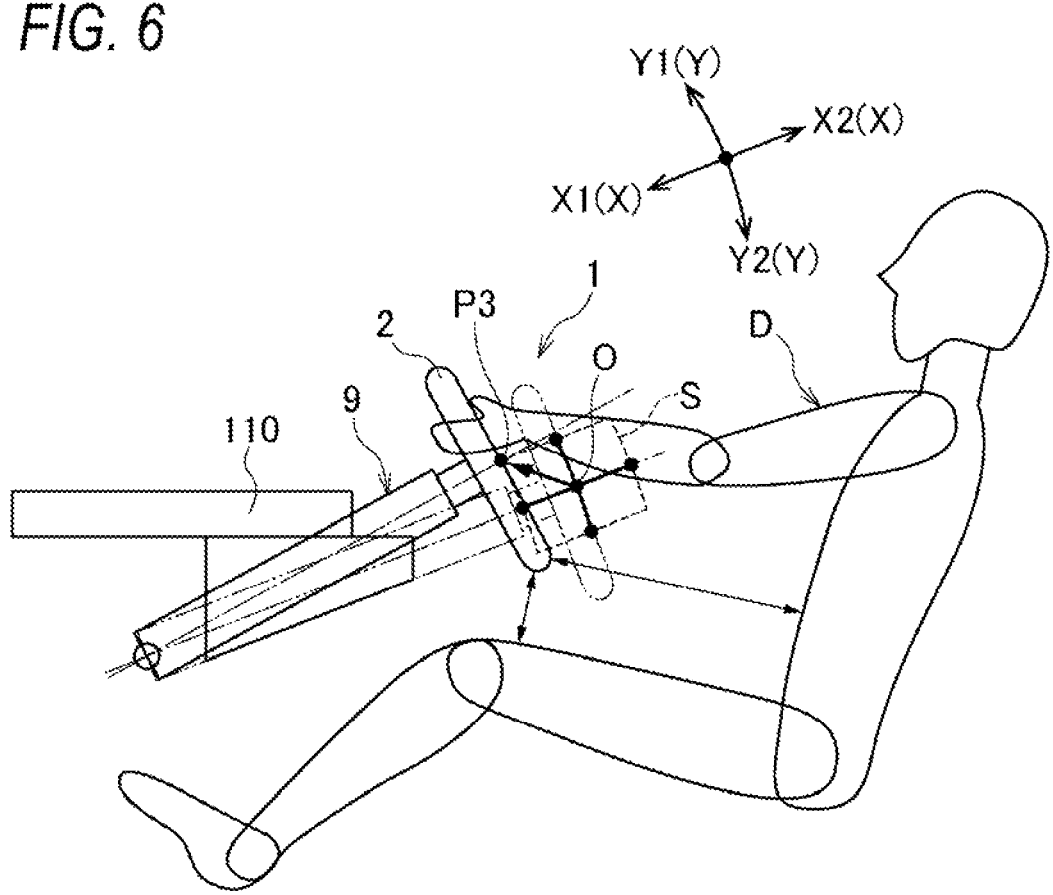
FIG. 6 shows the adjustment operation and the storage operation.

FIG. 6 shows a state where the steering wheel 2 is moved within the adjustment operation range S from the origin O to a position that maximizes the space of the driver seat for the driver D, and is stored in a storage position P3. That is, the steering wheel 2 is located on the most upper side Y1 and the most front side X1 within the adjustment operation range S. The steering wheel 2 located at the origin O is indicated by the two-dot chain line.

In this way, when the steering wheel 2 is stored, it is important to move the steering wheel 2 toward the upper side Y1 in an initial stage to widen the space around the driver D. Therefore, in the present application, in order to quickly widen the space around the driver D, the motor control unit 100 drives the brushless motors 71 and 81 in such a manner that an upward movement operation of moving the steering wheel 2 upward is included at a beginning of the storage operation.

That is, at the beginning of the storage operation, the motor control unit 100 drives at least the brushless motor 71 of the electric tilt mechanism 7 to move the steering wheel 2 toward the upper side Y1. The motor control unit 100 may drive the brushless motor 81 of the electric telescopic mechanism 8 at the same time as the brushless motor 71 of the electric tilt mechanism 7 at the beginning of the storage operation, and moves the steering wheel 2 in an oblique direction (toward the upper side Y1 and toward the front side X1) as shown in FIG. 6. Meanwhile, it is not preferable that the movement of the steering wheel 2 at the beginning of the storage operation is movement that does not include movement toward the upper side Y1 (for example, movement only toward the front side X1 or obliquely downward movement (toward the lower side Y2 and toward the front side X1)).

When the range where the storage operation of the steering wheel 2 can be performed coincides with the adjustment operation range S, it is desirable to store the steering wheel 2 in the storage position P3, which is located on the most upper side Y1 and the most front side X1 within the adjustment operation range S, as shown in FIG. 6.

Figure 7:
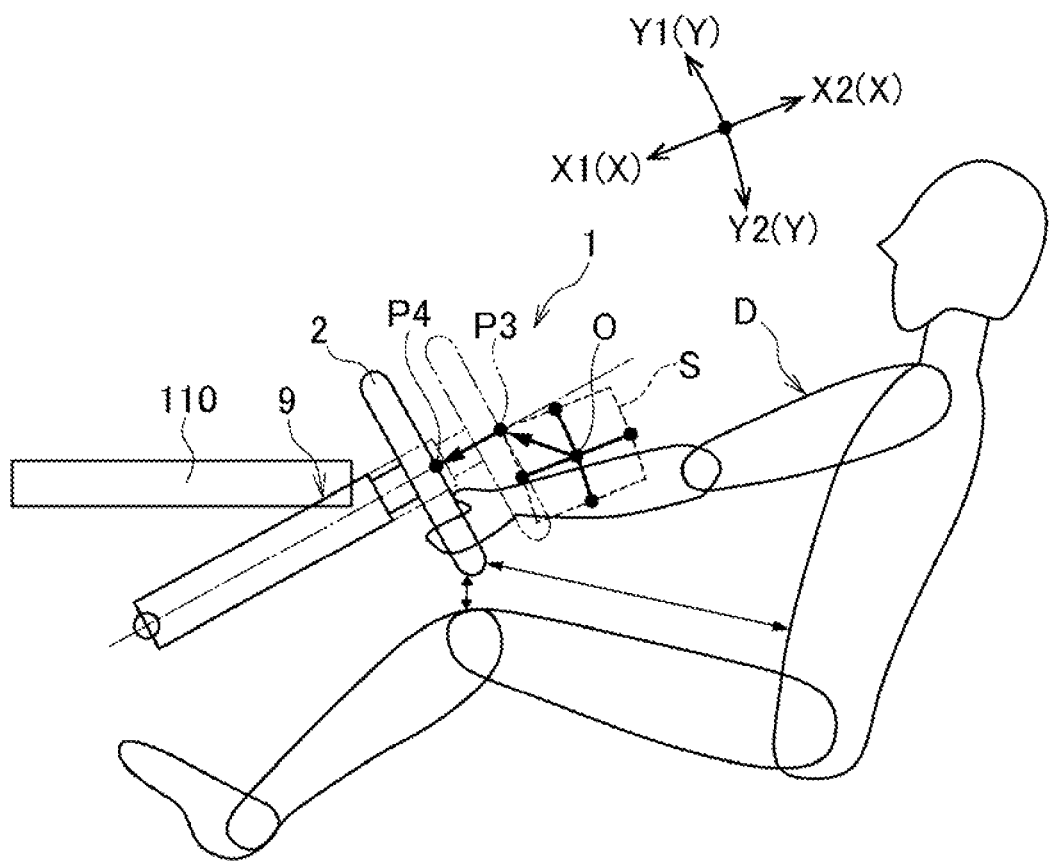
FIG. 7 shows the adjustment operation and the storage operation.

However, when the range where the storage operation of the steering wheel 2 can be performed extends to the outside of the adjustment operation range S, the steering wheel 2 may be further moved toward the front side X1 from the state shown in FIG. 6 and stored in a storage position P4, as shown in FIG. 7. According to such a configuration, the space around the driver D can be further widened.

In this way, according to the present application, the position adjustment mechanism (the electric tilt mechanism 7 and the electric telescopic mechanism 8) can perform the storage operation of storing the steering wheel 2 in the storage positions P1, P3, and P4 to secure the space of the driver seat for the driver D, and the adjustment operation of adjusting the steering wheel 2 to the driving position that is suitable for driving. The motor control unit 100 drives the brushless motors 71 and 81 such that the upward movement operation of moving the steering wheel 2 toward the upper side Y1 is included at the beginning of the storage operation. Therefore, during the storage operation, the space around the driver D can be quickly widened, and the driver D can feel that the steering wheel 2 is moving quickly.

Figure 8:
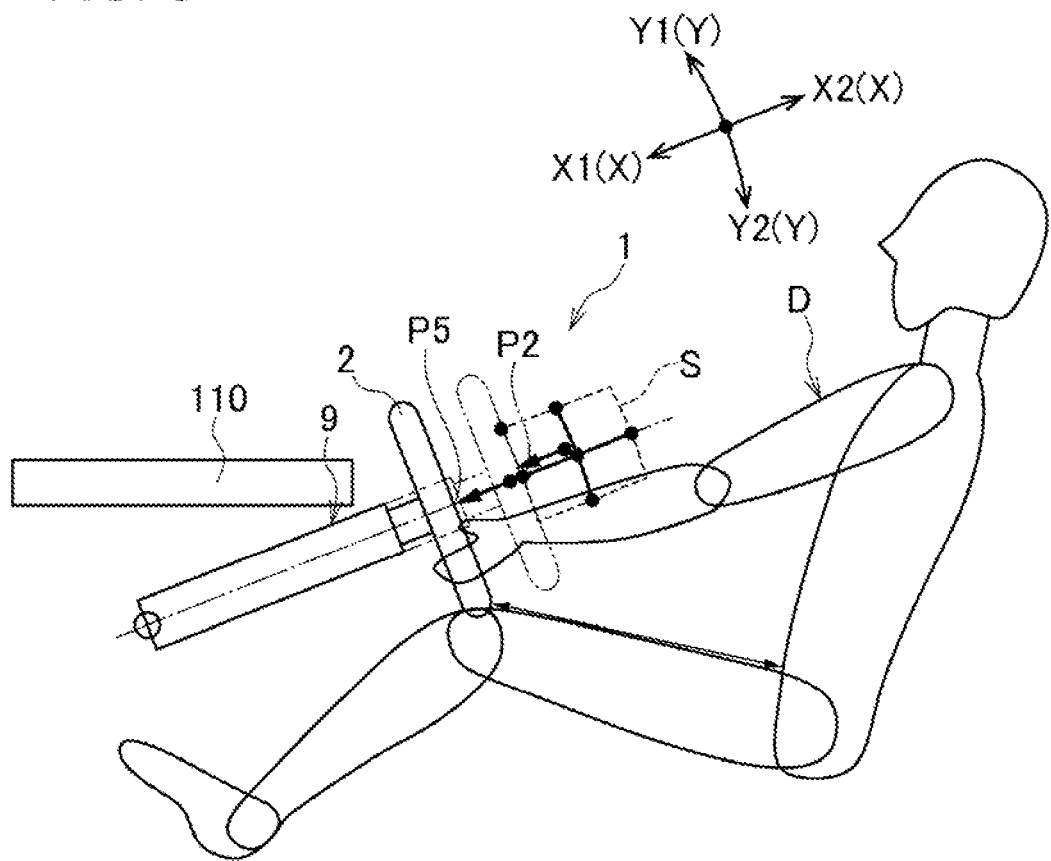
FIG. 8 shows the adjustment operation and the storage operation.

In contrast, FIG. 8 shows a state where the steering wheel 2 is not moved toward the upper side Y1 but is moved only toward the front side X1 to reach the storage position P2 at the beginning of the storage operation, and is then further moved toward the front side X1 so as to extend to the outside of the adjustment operation range S and stored in a storage position P5. In this case, the space around the knees of the driver D becomes cramped. Therefore, the storage operation shown in FIG. 8 is not preferable.

Figure 9:
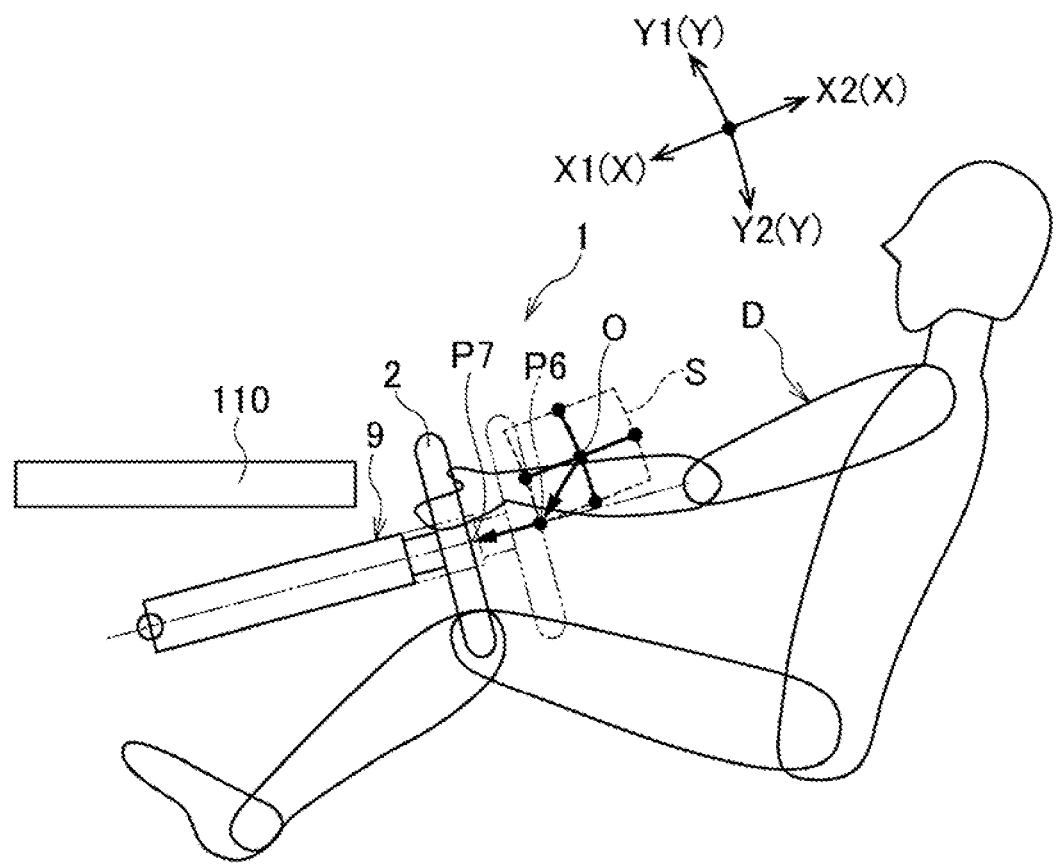
FIG. 9 shows the adjustment operation and the storage operation.

FIG. 9 shows a state where the steering wheel 2 is moved toward the lower side Y2 and toward the front side X1 to reach a storage position P6 at the beginning of the storage operation, and is then further moved toward the front side X1 so as to extend to the outside of the adjustment operation range S and stored in a storage position P7. In this case, since the steering wheel 2 is moved toward the lower side Y2 at the beginning of the storage operation, the space around the knees of the driver D becomes more cramped. Therefore, the storage operation shown in FIG. 9 is not preferable.

Next, a speed of the steering wheel 2 during the adjustment operation and the storage operation will be described.

Figure 10:
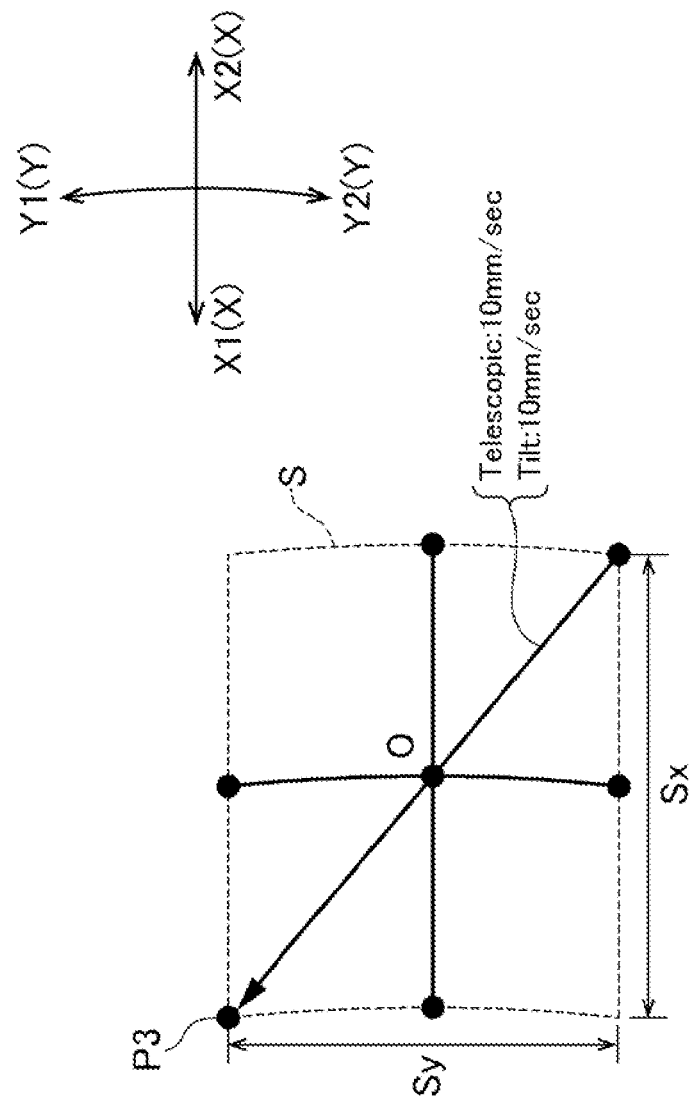
FIG. 10 shows a speed during the adjustment operation and the storage operation.

During the adjustment operation in which the driver D adjusts the steering wheel 2 to the driving position that is suitable for driving, the speed of the steering wheel 2 is preferably about 10 mm/sec in both the telescopic direction X and the tilt direction Y This speed is not excessively fast for the driver D, and thus enables an accurate adjustment operation. As shown in FIG. 10, a length Sx of the adjustment operation range S in the telescopic direction X and a length Sy in the tilt direction Y are both about 50 to 80 mm, and thus the adjustment operation range S is substantially square.

FIG. 10 shows a state where the steering wheel 2 is stored in the storage position P3 that is located on the most front side X1 and the most upper side Y1 from a position located on the most rear side X2 and the most lower side Y2 in the adjustment operation range S. In the shown example, the speed during the storage operation is set to be equal to the speed during the adjustment operation (about 10 mm/sec in each of the telescopic direction X and the tilt direction Y), and thus it is time-consuming to reach the storage position P3.

Therefore, according to the present application, the motor control unit 100 drives the brushless motors 71 and 81 in such a manner that the speed of the steering wheel 2 during the storage operation is higher than the speed of the steering wheel 2 during the adjustment operation.

Figure 11:
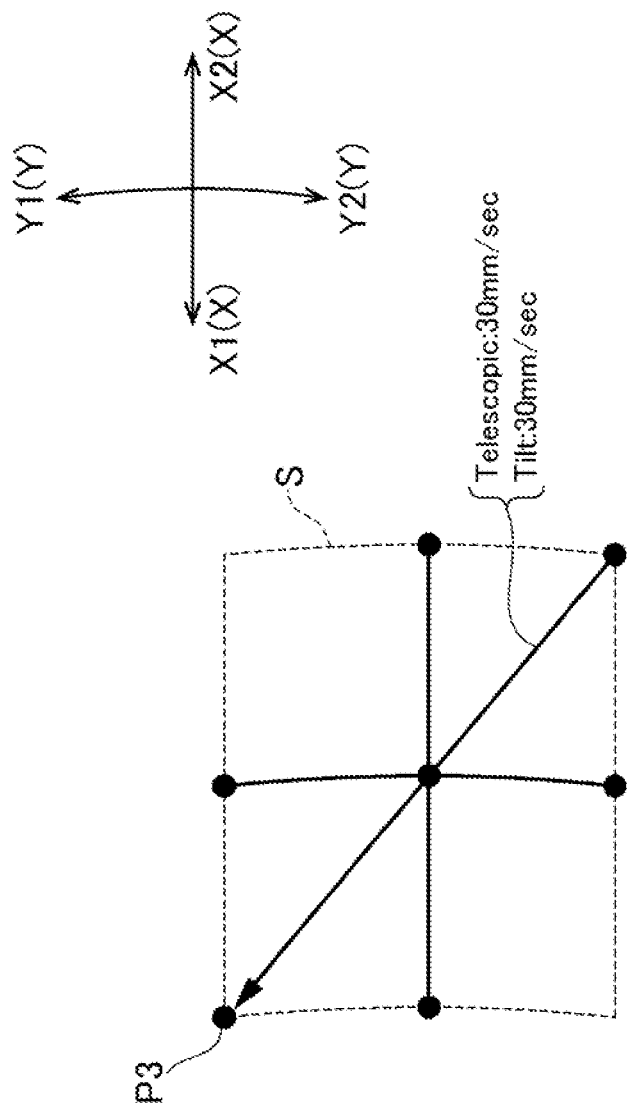
FIG. 11 shows the speed during the adjustment operation and the storage operation.

For example, in the example of FIG. 11, the speed of the steering wheel 2 during the storage operation is 30 mm/sec toward the front side X1 in the telescopic direction X and 30 mm/sec toward the upper side Y1 in the tilt direction Y. Therefore, the space around the driver D is expanded more quickly.

Figure 12:
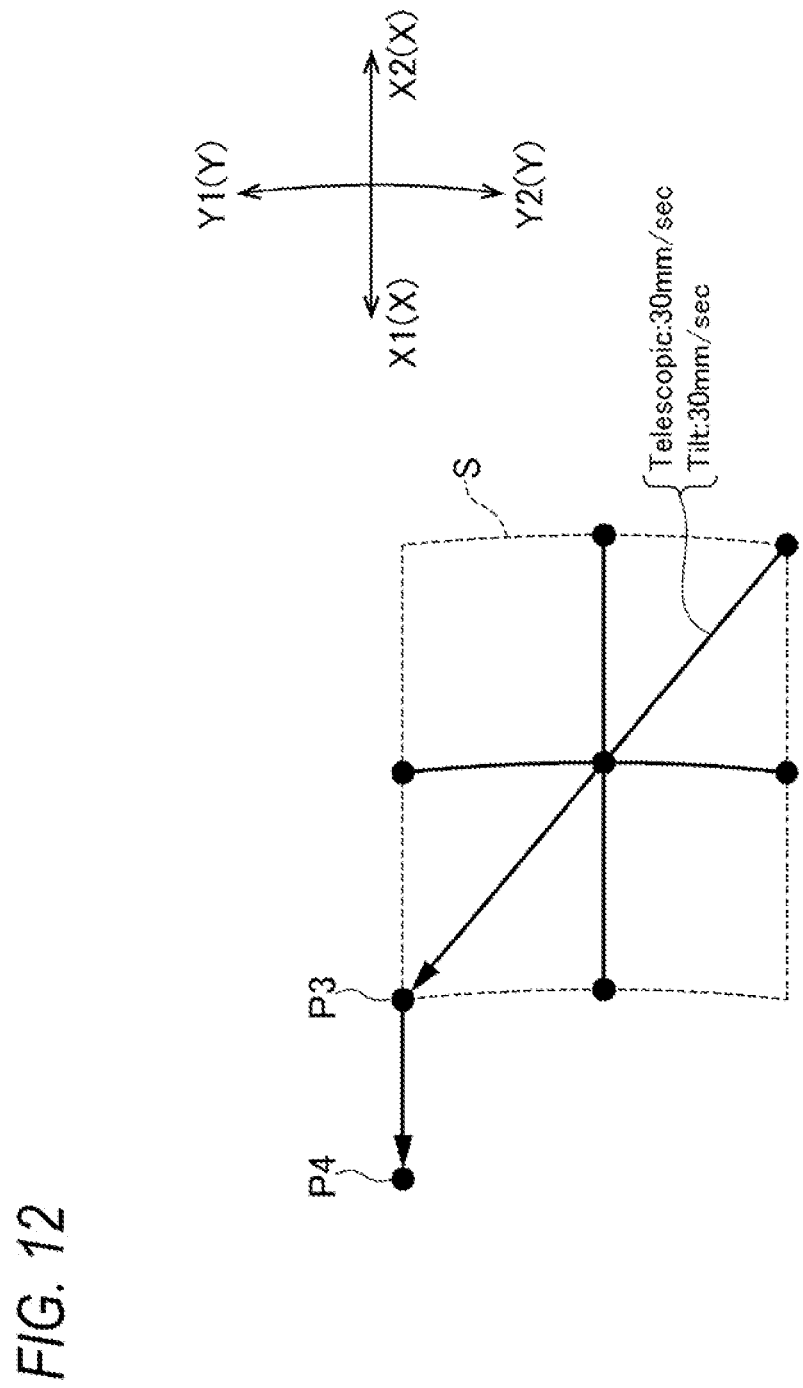
FIG. 12 shows the speed during the adjustment operation and the storage operation.

When the range where the storage operation of the steering wheel 2 can be performed extends to the outside of the adjustment operation range S, the steering wheel 2 may be further moved from the state shown in FIG. 11 (storage position P3) toward the front side X1 in the telescopic direction X and stored in the storage position P4, as shown in FIG. 12. According to such a configuration, the space around the driver D can be further widened. In this case, the speed of the steering wheel 2 toward the front side X1 outside the adjustment operation range S is equal to or higher than the speed within the adjustment operation range S (30 mm/s or more).

Figure 13:
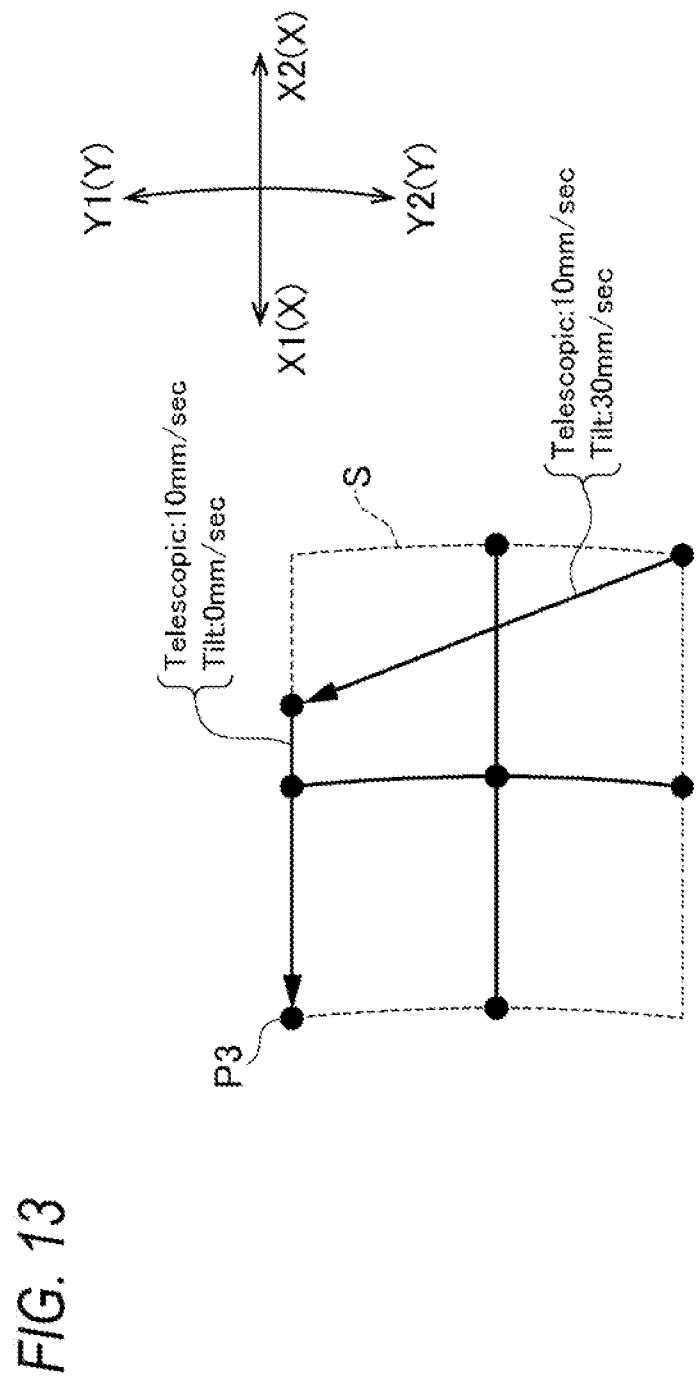
FIG. 13 shows the speed during the adjustment operation and the storage operation.

Although the speed of the steering wheel 2 during the storage operation is constant in the example of FIG. 11, the motor control unit 100 may drive the brushless motors 71 and 81 in such a manner that the speed of the steering wheel 2 changes during the storage operation. More specifically, the motor control unit 100 drives the brushless motors 71 and 81 such that an initial speed of the steering wheel 2 during the storage operation (speed of the upward movement operation) is higher than the speed of the steering wheel 2 at a different point in time (a later point in time) during the storage operation. In the example of FIG. 13, the initial speed of the steering wheel during the storage operation (speed of the upward movement operation) is 10 mm/sec toward the front side X1 in the telescopic direction X and 30 mm/sec toward the upper side Y1 in the tilt direction Y. After the steering wheel reaches an upper end of the adjustment operation range S, and the speed of the steering wheel is 10 mm/sec toward the front side X1 in the telescopic direction X and 0 mm/sec in the tilt direction Y. In this way, during at least an initial process of the storage operation (process including the upward movement operation), the speed of the steering wheel 2 is set to be higher than the speed during the adjustment operation, so that the space around the driver D is expanded more quickly.

Figure 14:
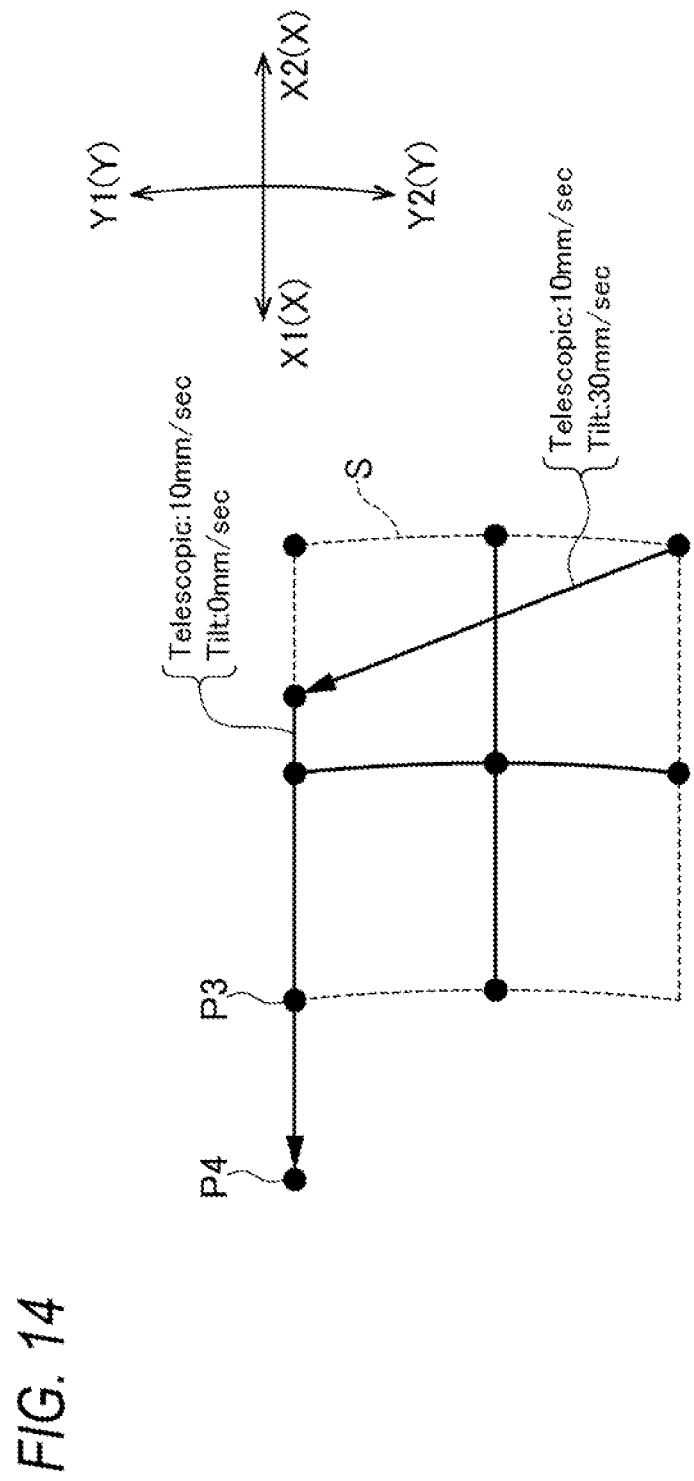
FIG. 14 shows the speed during the adjustment operation and the storage operation.

When the range where the storage operation of the steering wheel 2 can be performed extends to the outside of the adjustment operation range S, the steering wheel 2 may be further moved from the state shown in FIG. 13 toward the front side X1 in the telescopic direction X and stored in the storage position P4, as shown in FIG. 14. According to such a configuration, the space around the driver D can be further widened. In this case, the speed of the steering wheel 2 toward the front side X1 outside the adjustment operation range S is equal to or higher than the speed within the adjustment operation range S (30 mm/s or more).

The motor control unit 100 determines the speed of the steering wheel 2 during the storage operation based on a position of the steering wheel 2 immediately before the storage operation. More specifically, when the position of the steering wheel 2 immediately before the storage operation is located on the upper side Y1 within the adjustment operation range S, the motor control unit 100 controls the speed of the steering wheel 2 toward the upper side Y1 during the storage operation to be slower than usual. For example, when the position of the steering wheel 2 immediately before the storage operation is close to an upper limit of the tilt direction Y in the adjustment operation range S, the speed of the steering wheel 2 toward the upper side Y1 during the storage operation is, for example, about 5 mm/sec.

Even if an amount of movement in the tilt direction Y is small during the storage operation, the driver D feels strange when the speed of the steering wheel 2 toward the upper side Y1 is high. Therefore, when the amount of movement in the tilt direction Y is small during the storage operation, the speed of the steering wheel 2 toward the upper side Y1 during the storage operation is set to be lower than usual as described above.

The position adjustment mechanism can perform a return operation of returning the steering wheel 2 stored in the storage position back to a return position in the adjustment operation range S, which is a position where the driver D can operate. The motor control unit 100 controls the brushless motors 71 and 81 so as to perform the return operation when entrance of the driver D is completed or when the automatic driving of the vehicle ends.

Figure 15:
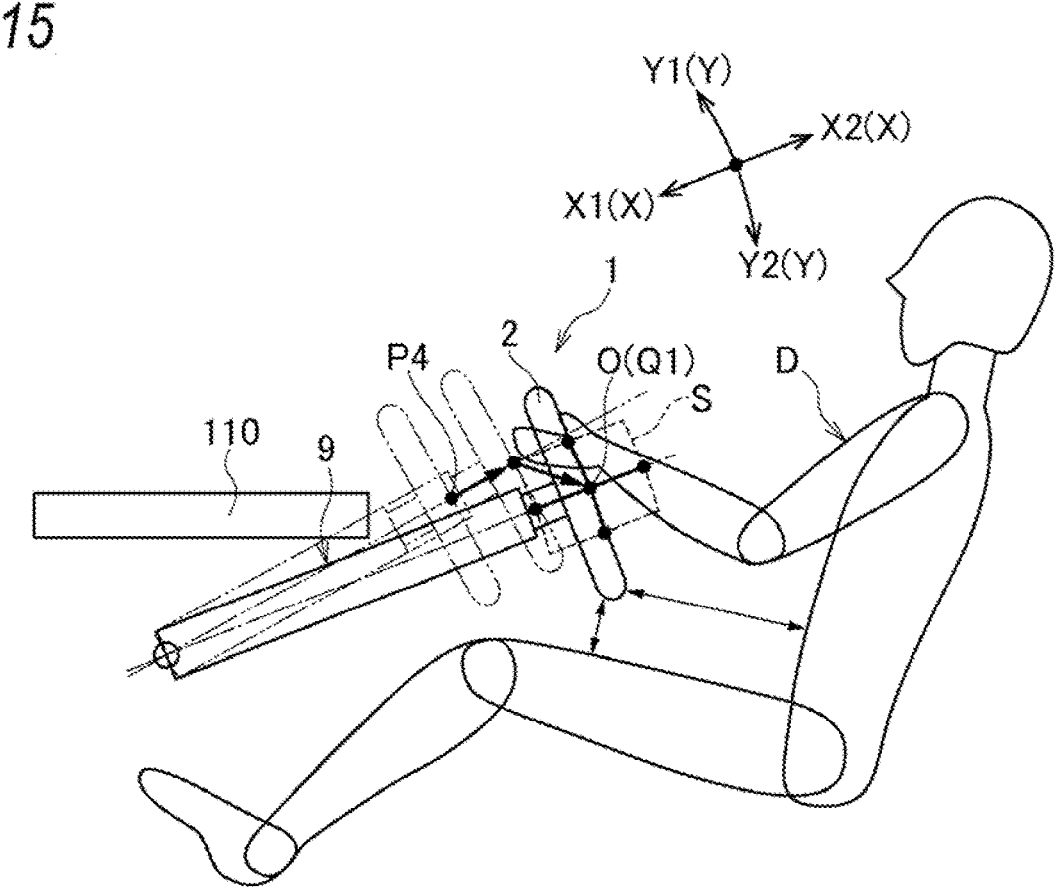
FIG. 15 shows a return operation.

For example, when the steering wheel 2 is stored at the storage position P4 from the origin O along a path shown in FIG. 7, the steering wheel 2 may return from the storage position P4 to the origin O (return position Q1) in such a manner that a path of the return operation is along a locus of the storage operation, as shown in FIG. 15. In this case, the return operation can be performed while securing the space around the knees of the driver D.

It is desirable that the driver D can predict a return position of the steering wheel 2 when the return operation is performed. In order to realize such design, the motor control unit 100 may drive the brushless motors 71 and 81 in such a manner that the speed of the steering wheel 2 changes during the return operation. More specifically, the motor control unit 100 may drive the brushless motors 71 and 81 such that a final speed during the process of the return operation (speed immediately before stopping) is lower than the speed of the operation at a different point in time during the return operation.

Figure 16:
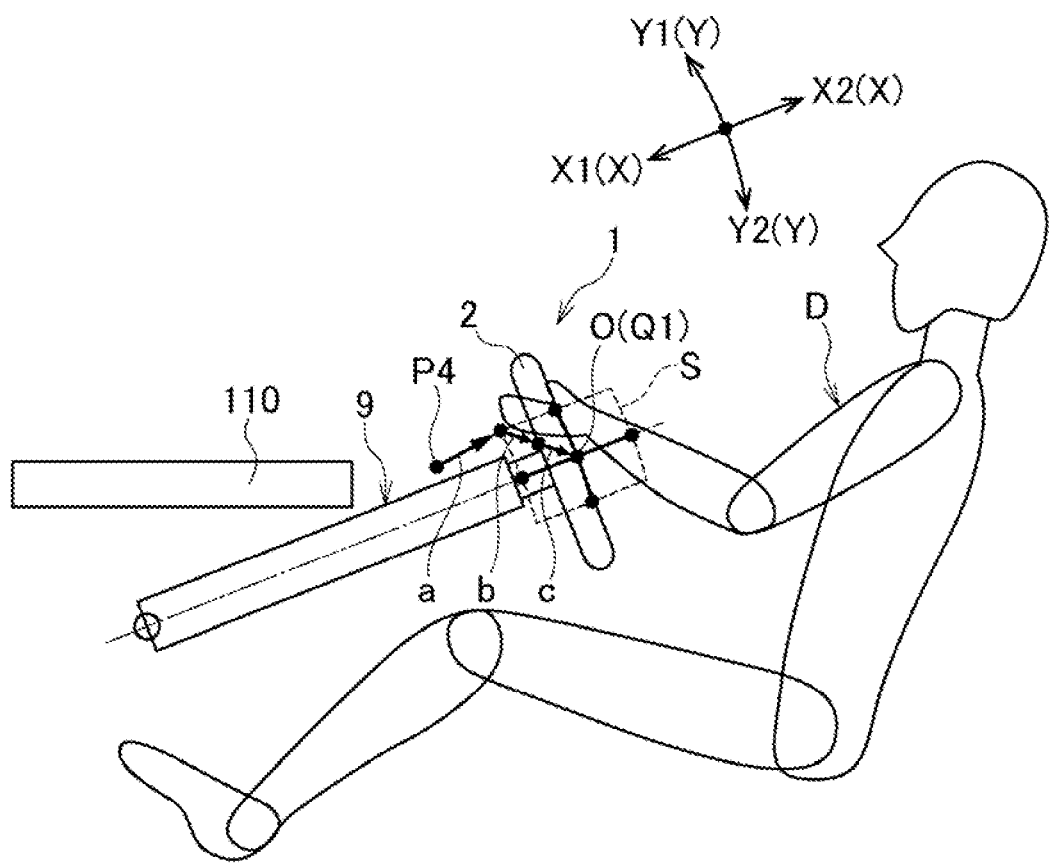
FIG. 16 shows the return operation.

For example, as shown in FIG. 16, when the moving speed of the steering wheel 2 along paths indicated by a, b, and c in FIG. 16 is respectively referred to as Va, Vb, and Vc, Va>Vb>Vc may be satisfied. As shown in FIG. 16, the speed of the steering wheel 2 during the return operation may be stepwisely decreased for each path, or the speed may be gradually decreased over time.

Figure 17:
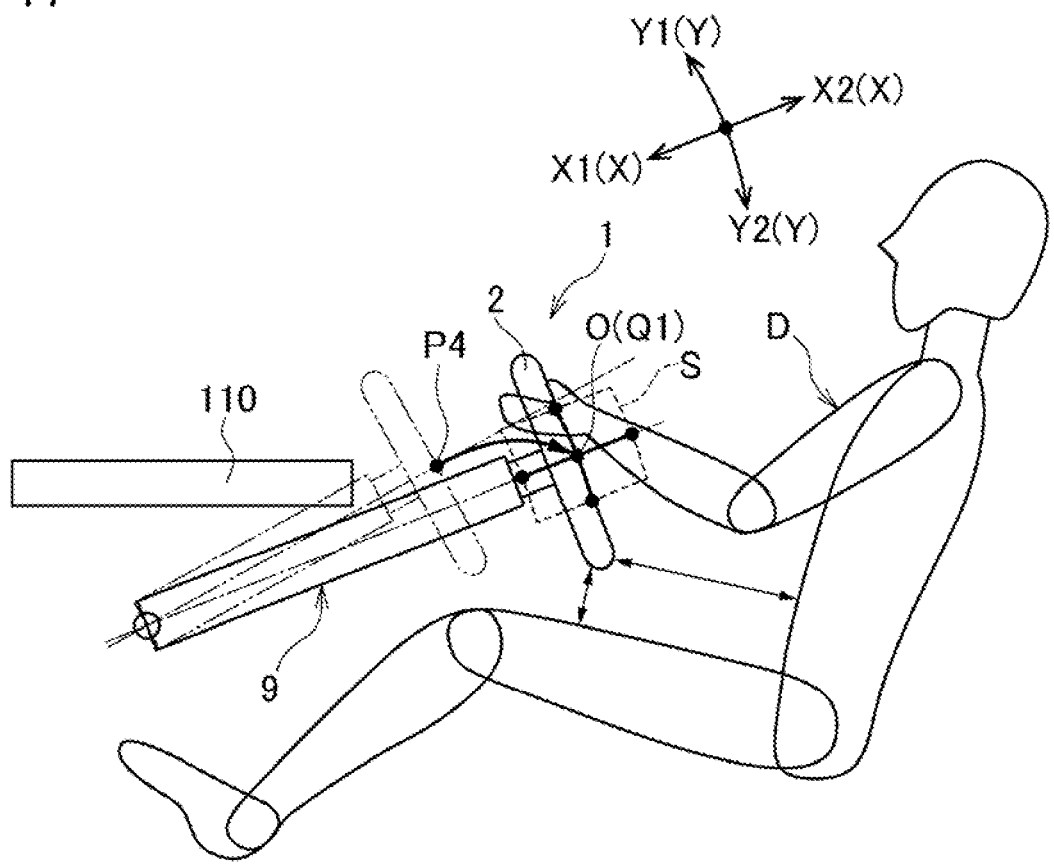
FIG. 17 shows the return operation.

As shown in FIG. 17, a locus of the steering wheel 2 during the return operation may have a curved shape. In order to secure the space around the driver D, the curved shape is preferably protruded toward the upper side Y1.

Figure 18:
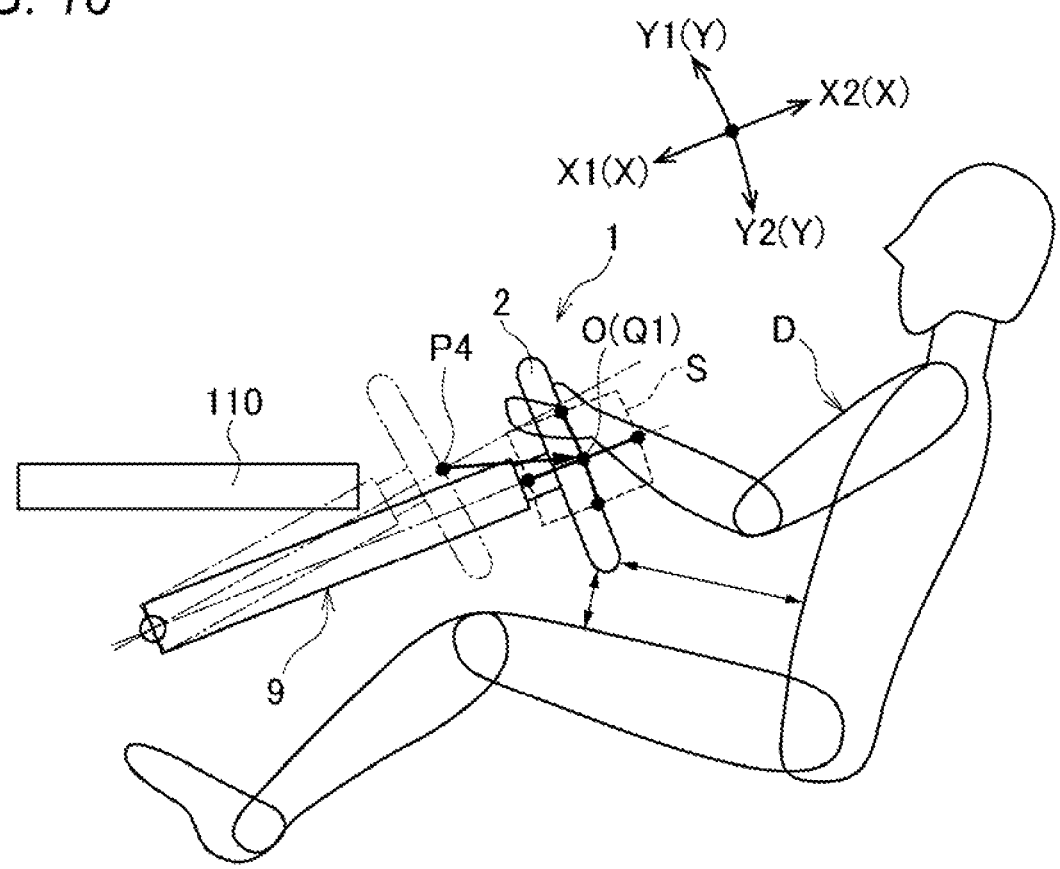
FIG. 18 shows the return operation.

As shown in FIG. 18, the locus of the steering wheel 2 during the return operation may have a straight linear shape.

Figure 19:
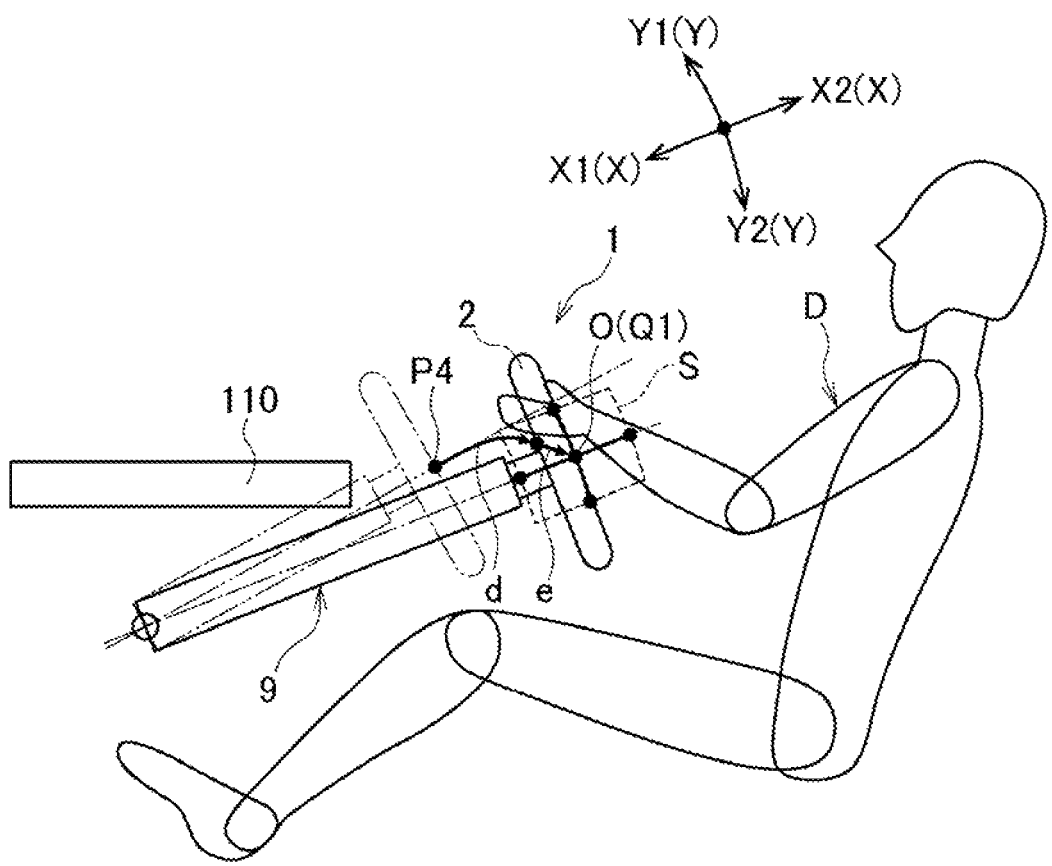
FIG. 19 shows the return operation.

As shown in FIG. 19, the locus of the steering wheel 2 during the return operation may be a combination of a curved shape and a straight linear shape. Further, when the moving speed of the steering wheel 2 along paths indicated by a curve d and a straight line e in FIG. 19 is respectively referred to as Vd and Ve, Vd>Ve may be satisfied.

As described above, by adopting the configuration in which the storage operation and the return operation are different from each other in (i) locus and/or (ii) speed, the driver D can easily predict the return position of the steering wheel 2.

Further, the electrically adjustable steering 1 includes the notification unit 108 (see FIG. 2) that notifies completion of the return operation in advance during the return operation. The notification unit 108 notifies the driver D through using an image, light, sound, odor, vibration, or a combination thereof.

Examples of methods in which the notification unit 108 uses sounds to perform notification can include outputting a voice such as "driving is available" or "driving will be available" immediately before the completion of the return operation, outputting any sound during the return operation and stopping the sound immediately before the completion of the return operation, and gradually reducing volume of any sound during the return operation.

Next, the speed of the steering wheel 2 during the return operation will be described.

Figure 20:
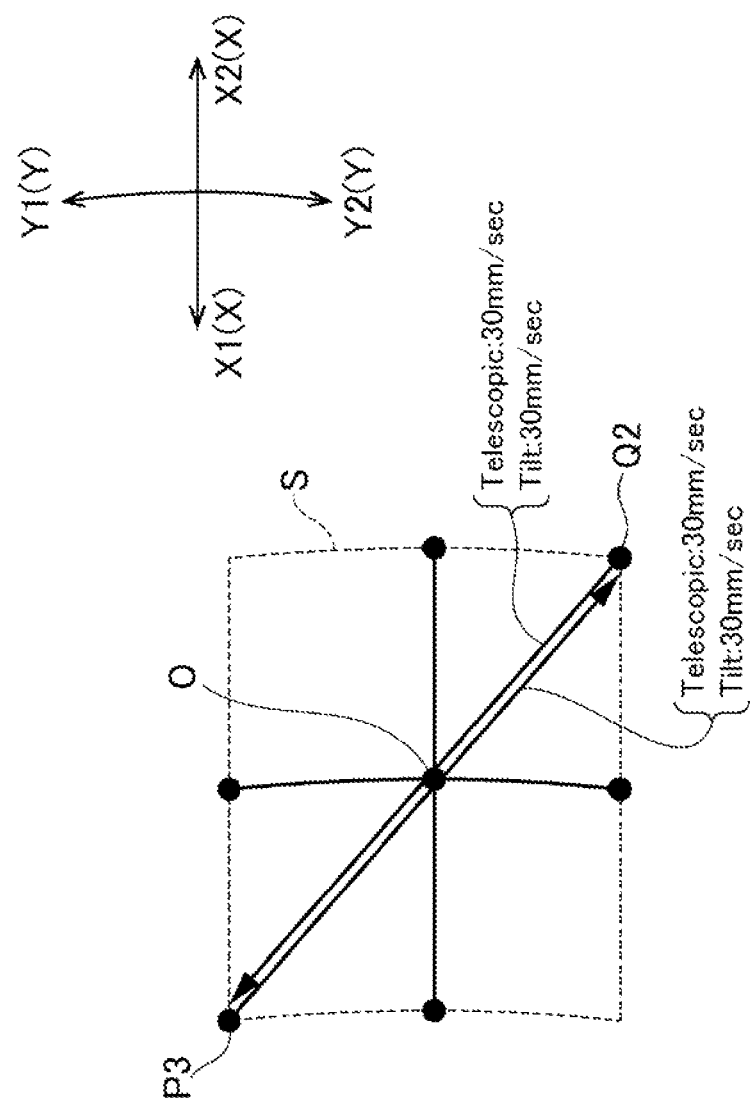
FIG. 20 shows a speed during the return operation.

FIG. 20 shows an example in which the return operation is performed from the storage position P3 to a return position Q2 located on the most rear side X2 and the most lower side Y2 in the adjustment operation range S after the steering wheel 2 is stored in the storage position P3, which is located on the most front side X1 and the most upper side Y1, from the position located on the most rear side X2 and the most lower side Y2 in the adjustment operation range S. In order to more quickly return the steering wheel 2 to the return position Q2, the speed of the steering wheel 2 during the return operation may be higher than the speed of the steering wheel 2 during the adjustment operation (about 10 mm/second in each of the telescopic direction X and the tilt direction Y).

In the example of FIG. 20, the speed of the steering wheel 2 during the return operation is set to 30 mm/sec toward the rear side X2 in the telescopic direction X and 30 mm/sec toward the lower side Y2 in the tilt direction Y, and the steering wheel 2 quickly moves linearly from the storage position P3 to the return position Q2.

Figure 21:
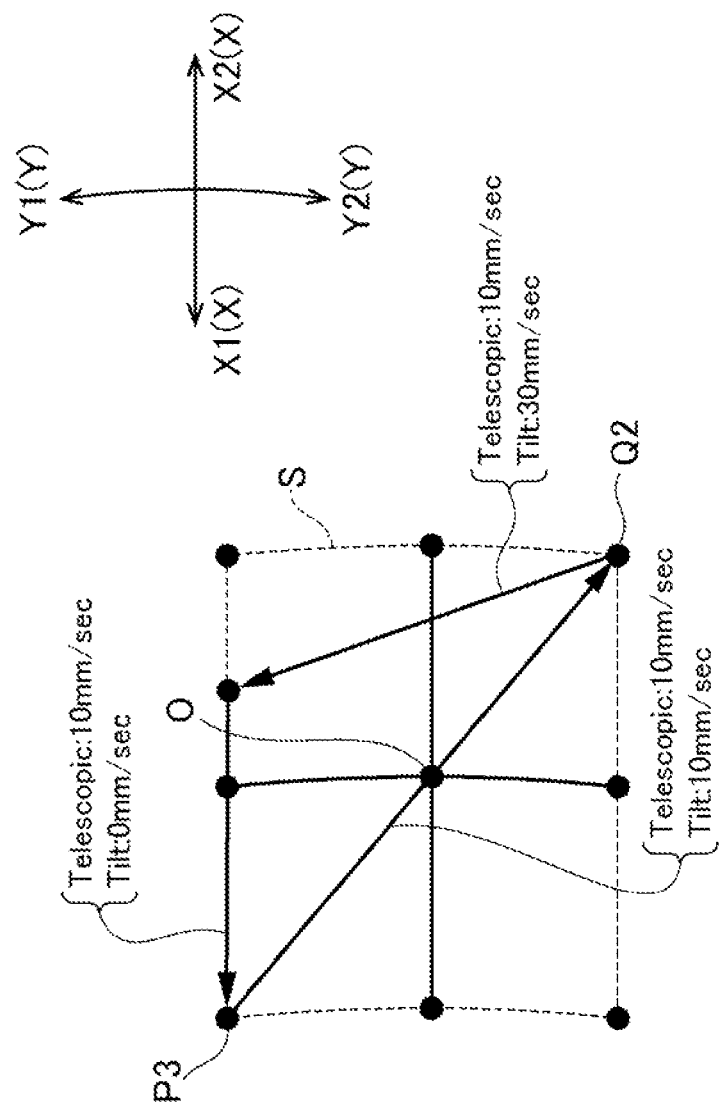
FIG. 21 shows the speed during the return operation.

In the example of FIG. 21, the initial speed of the steering wheel 2 during the storage operation is 10 mm/sec toward the front side X1 in the telescopic direction X and 30 mm/sec toward the upper side Y1 in the tilt direction Y After the steering wheel 2 reaches the upper end of the adjustment operation range S, the steering wheel 2 reaches the storage position P3 at the speed of 10 mm/sec toward the front side X1 in the telescopic direction X and 0 mm/sec in the tilt direction Y. Then the speed of the steering wheel 2 during the return operation is set to 10 mm/sec toward the rear side X2 in the telescopic direction X and 10 mm/sec toward the lower side Y2 in the tilt direction Y, and the steering wheel 2 moves linearly from the storage position P3 to the return position Q2. The return position of the steering wheel 2 is easily predicted by the driver D since the steering wheel 2 is linearly returned from the storage position P3 to the return position Q2 during the return operation without following the locus during the storage operation.

Figure 22:
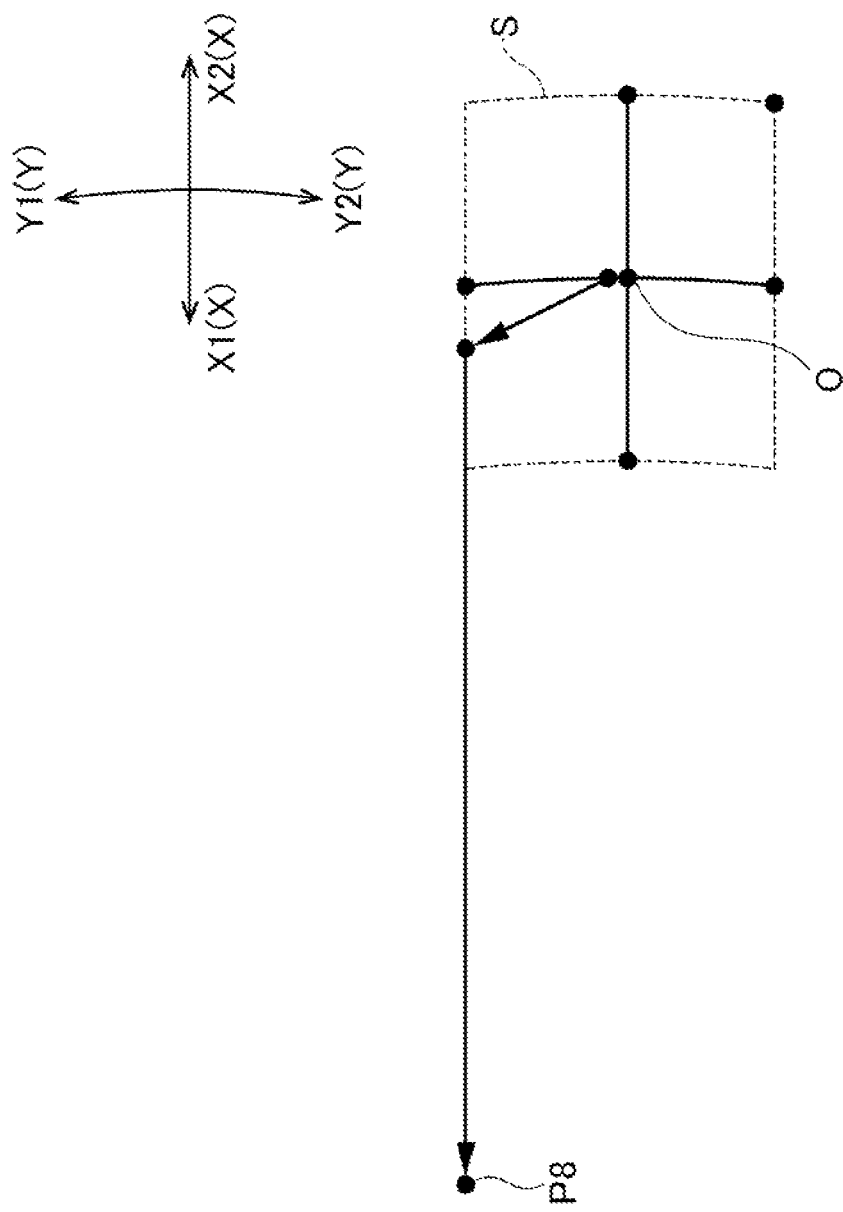
FIG. 22 shows the storage operation.
Figure 23:
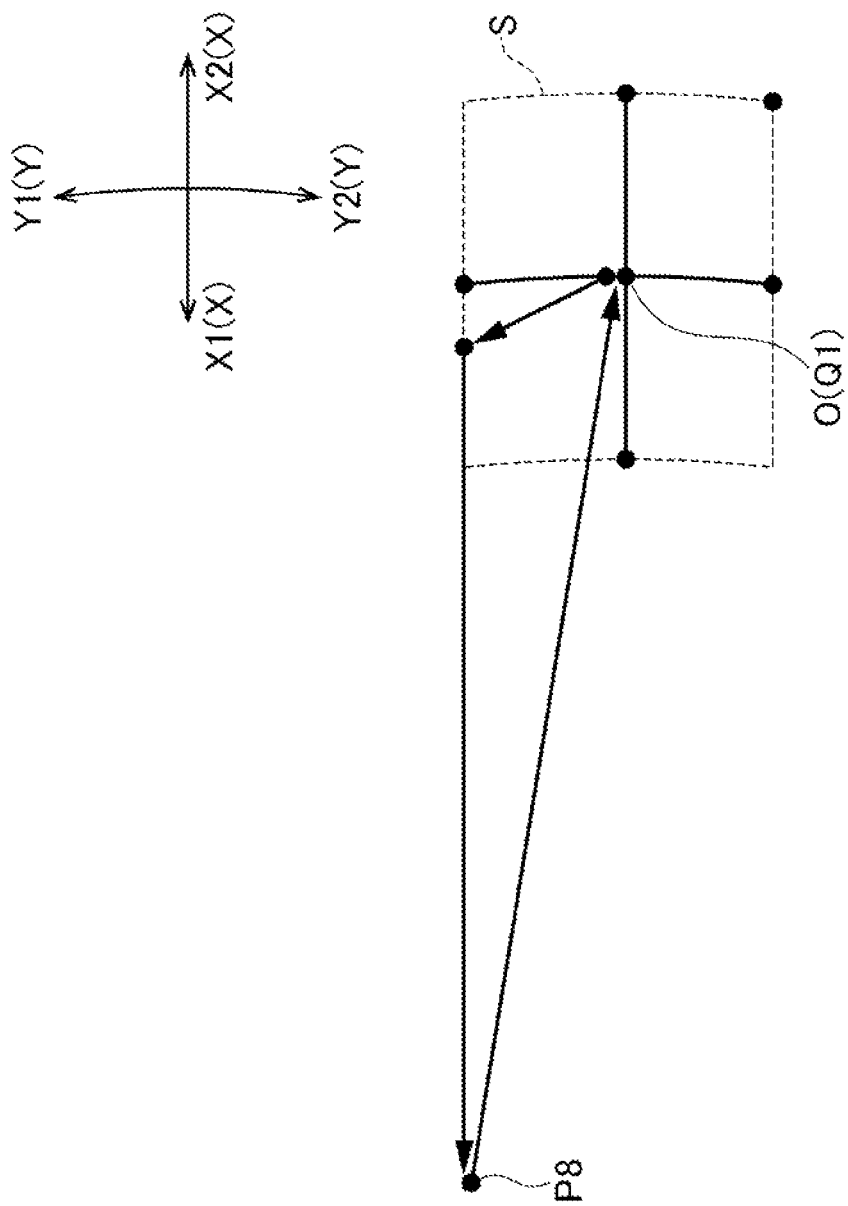
FIG. 23 shows the return operation.

The example of FIG. 22 shows a state where the steering wheel 2 is moved toward the front side X1 and moved to a storage position P8 outside the adjustment operation range S after the steering wheel 2 is moved toward the front side X1 and toward the upper side Y1 during the storage operation so as to reach the upper end of the adjustment operation range S. In this way, when the storage position P8 is outside the adjustment operation range S, the locus of the steering wheel 2 from the storage position P8 to the return position Q1 (origin O) during the return operation may have a straight linear shape, as shown in FIG. 23. In this case, the speed of the steering wheel 2 is set to, for example, 40 mm/sec toward the rear side X2 in the telescopic direction X and 4 mm/sec toward the lower side Y2 in the tilt direction Y The return position of the steering wheel 2 is easily predicted by the driver D since the steering wheel 2 is linearly returned from the storage position P8 to the return position Q1 during the return operation without following the locus during the storage operation.

Figure 24:
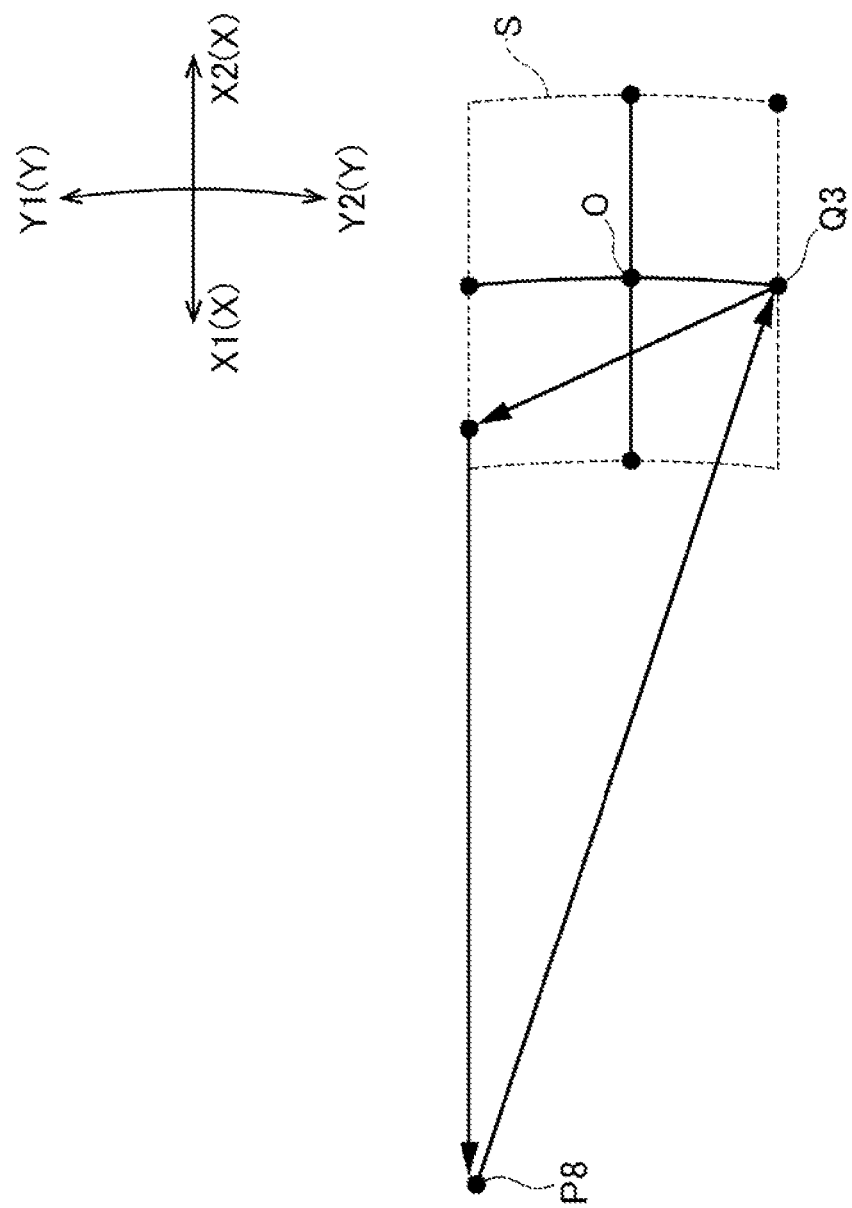
FIG. 24 shows the return operation.

In the example of FIG. 24, a return position Q3 is located below the origin O on a lower edge of the adjustment operation range S. In this case, as in the example of FIG. 23, the locus of the steering wheel 2 from the storage position P8 to the return position Q3 during the return operation may have a straight linear shape. In this case, the speed of the steering wheel 2 is set to, for example, 40 mm/sec toward the rear side X2 in the telescopic direction X and 9 mm/sec toward the lower side Y2 in the tilt direction Y The return position of the steering wheel 2 is easily predicted by the driver D since the steering wheel 2 is linearly returned from the storage position P8 to the return position Q3 during the return operation without following the locus during the storage operation.

Figure 25:
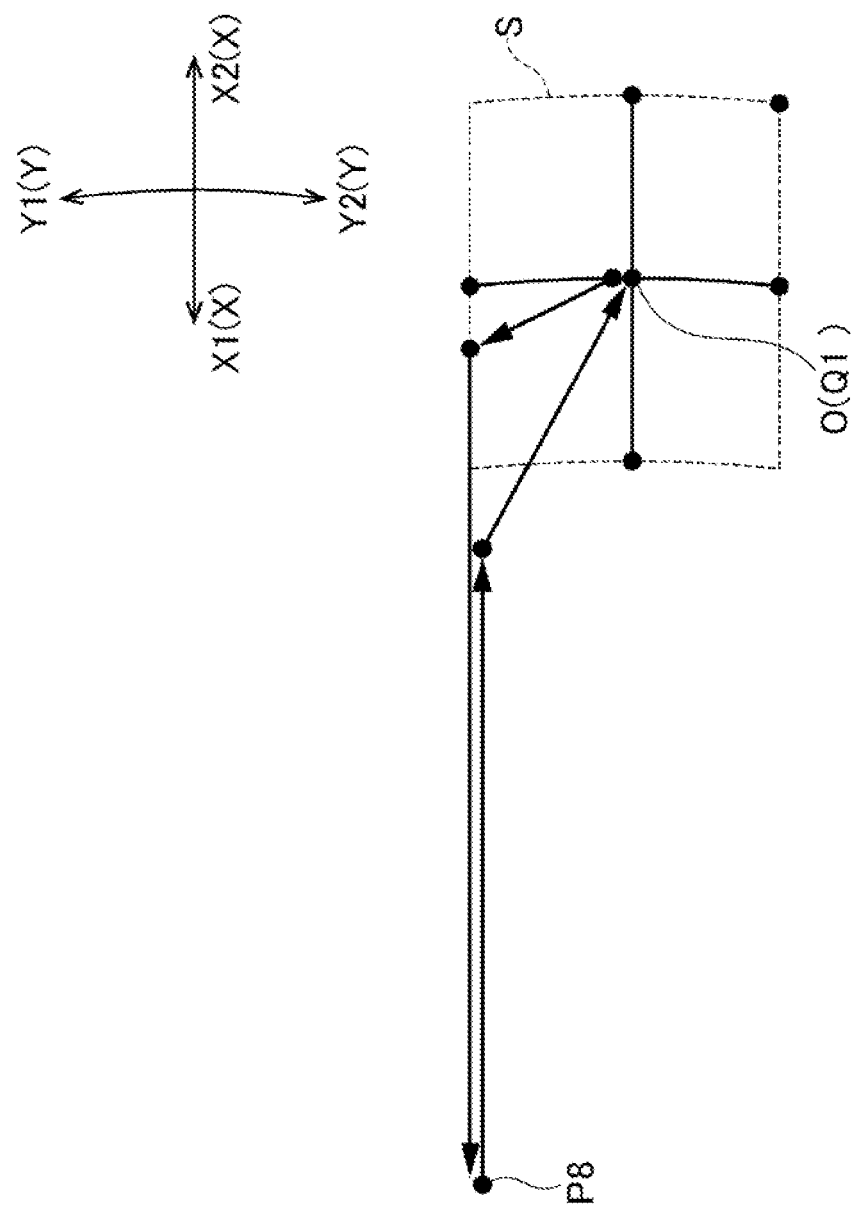
FIG. 25 shows the return operation.

In the example of FIG. 25, as in the example of FIG. 23, the storage position P8 is located in the adjustment operation range S, and the return position Q1 is located at the origin O. During the return operation, the steering wheel 2 may be only moved toward the rear side X2 in the telescopic direction X (without moving in the tilt direction Y) at first, and then linearly moved toward the rear side X2 and the lower side Y2 toward the return position Q1. In this case, the space around the knees of the driver D can be widely maintained as compared with the case where the steering wheel 2 linearly moves from the storage position P8 to the return position Q1.

Figure 26:
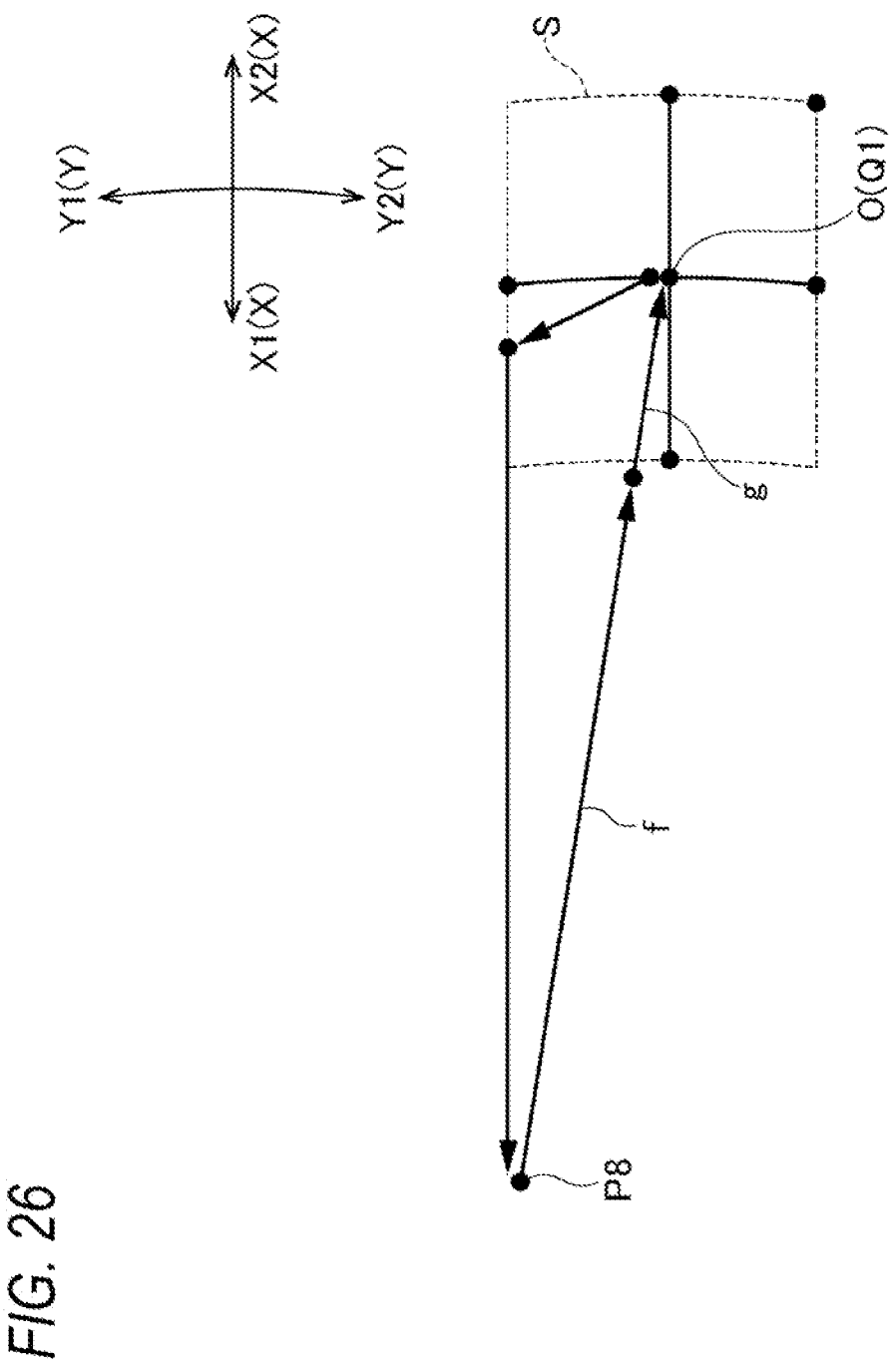
FIG. 26 shows the return operation.

In the example of FIG. 26, as in the example of FIG. 23, the storage position P8 is located in the adjustment operation range S, and the return position Q1 is located at the origin O. As in the example of FIG. 23, the locus of the steering wheel 2 from the storage position P8 to the return position Q1 during the return operation may have a straight linear shape. When the moving speed of the steering wheel 2 along paths indicated by f and g in FIG. 26 is respectively referred to as Va, Vf, and Vg, Vf>Vg may be satisfied. By stepwisely decreasing the moving speed of the steering wheel 2, the return position of the steering wheel 2 is easily predicted by the driver D.

Figure 27:
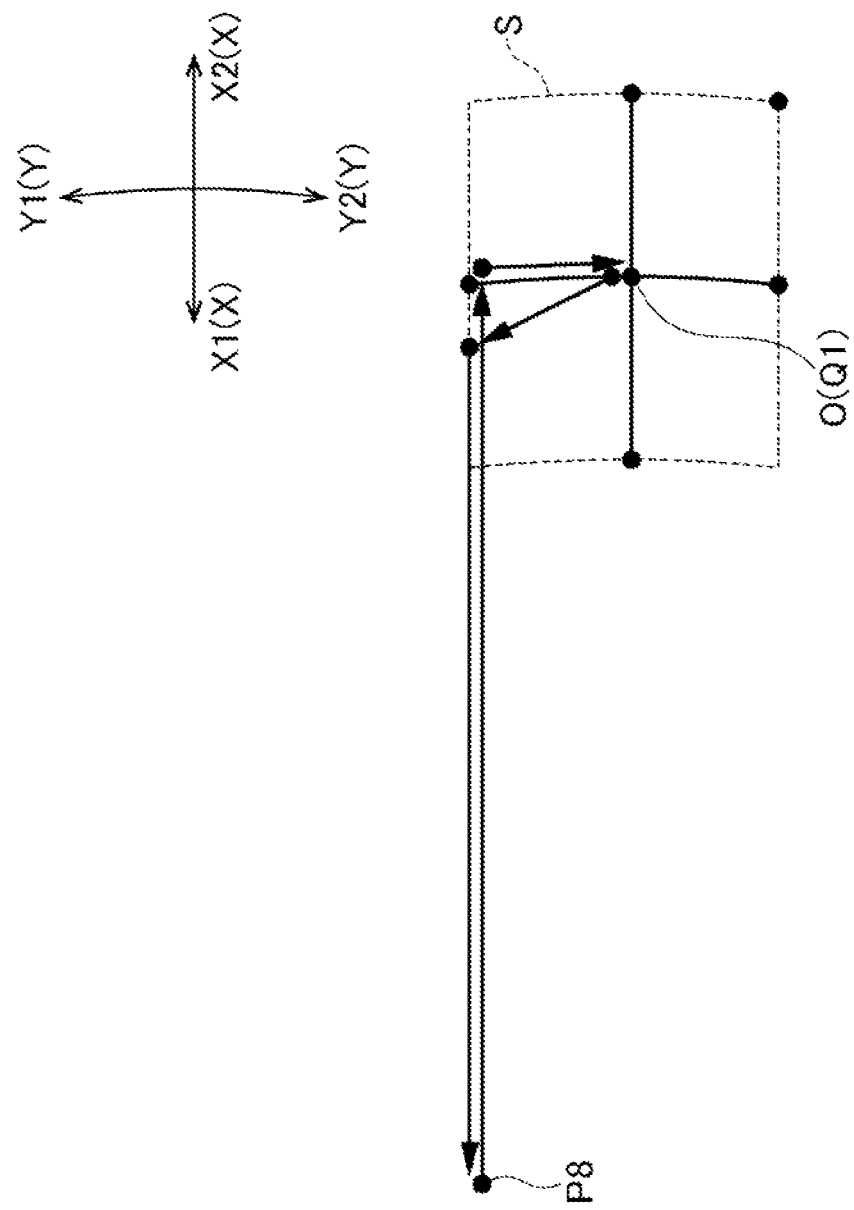
FIG. 27 shows the return operation.

In the example of FIG. 27, as in the example of FIG. 23, the storage position P8 is located in the adjustment operation range S, and the return position Q1 is located at the origin O. During the return operation, the steering wheel 2 is only moved toward the rear side X2 in the telescopic direction X (without moving in the tilt direction Y) at first, and is moved to the upper side Y1 of the return position Q1. Next, the steering wheel 2 may be moved toward the lower side Y2 in the tilt direction Y toward the return position Q1 (without moving in the telescopic direction X). In this case, the space around the knees of the driver D can be widely maintained as compared with the case where the steering wheel 2 linearly moves from the storage position P8 to the return position Q1.

In this way, it is preferable that the locus of the steering wheel 2 during the return operation is on a straight line L connecting the storage position P8 and the return position Q1 or in an area on the upper side Y1 relative to the straight line L.

Figure 28:
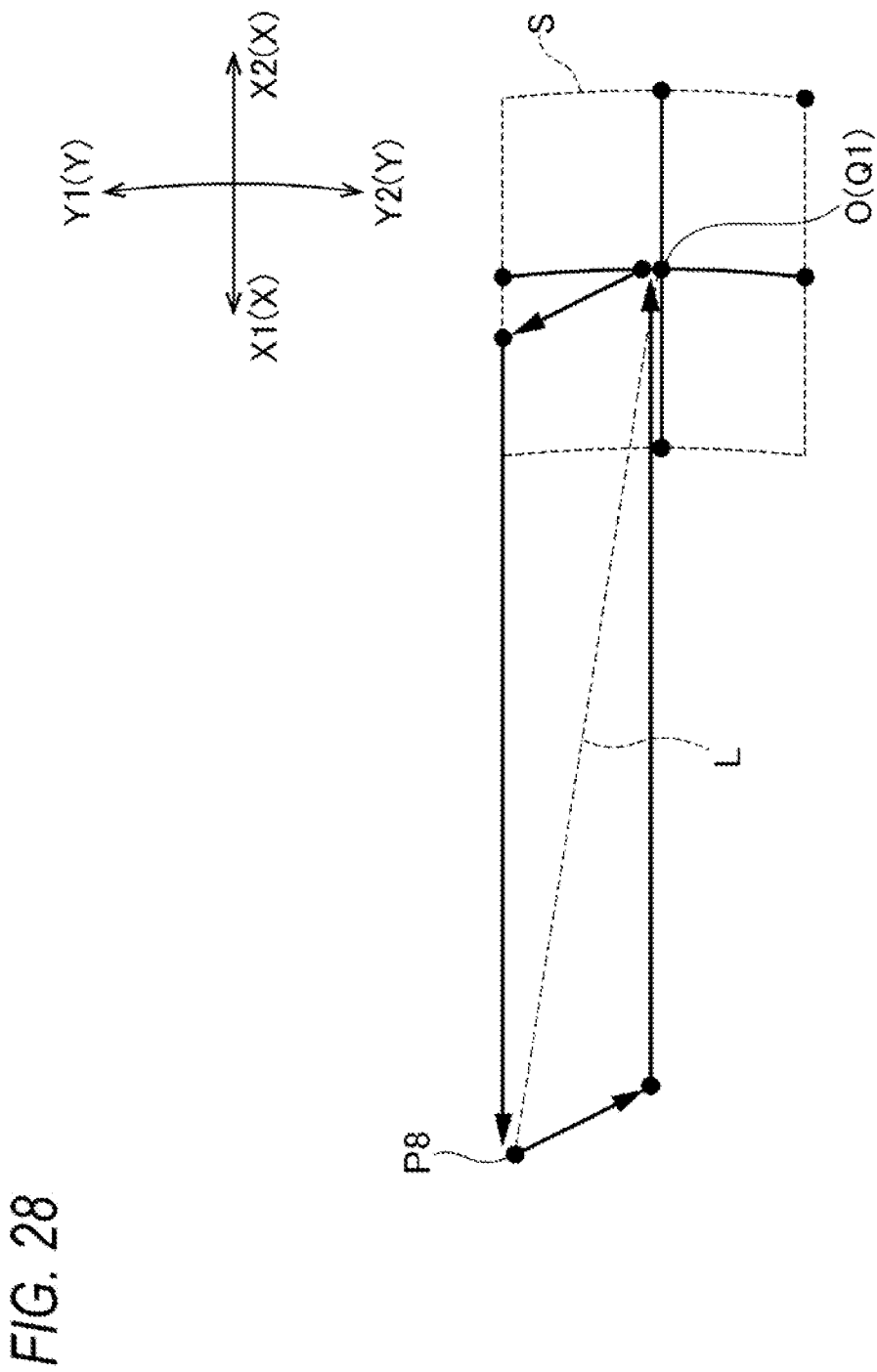
FIG. 28 shows the return operation.

For example, as shown in FIG. 28, when the locus of the steering wheel 2 during the return operation is located on the lower side Y2 relative to the straight line L connecting the storage position P8 and the return position Q1, the space around the knees of the driver D is narrowed, which is not preferable.

Figure 29:
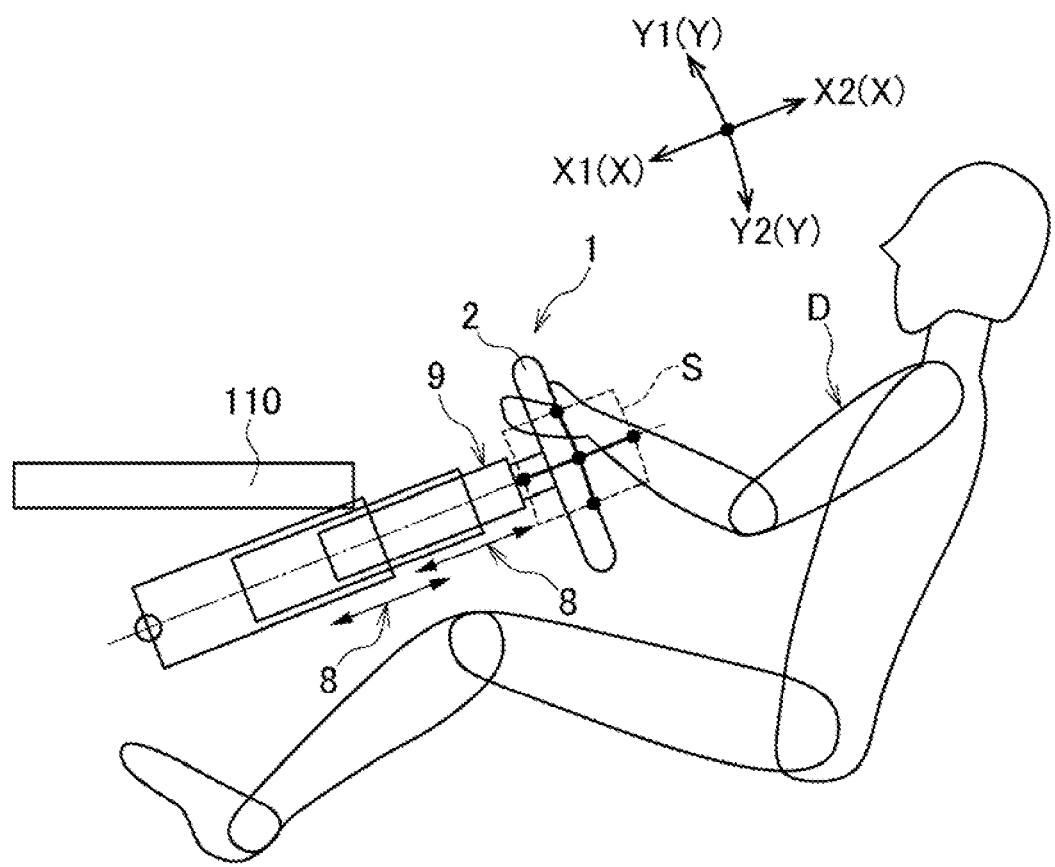
FIG. 29 is a schematic view of an electrically adjustable steering according to a modification.
Figure 30:
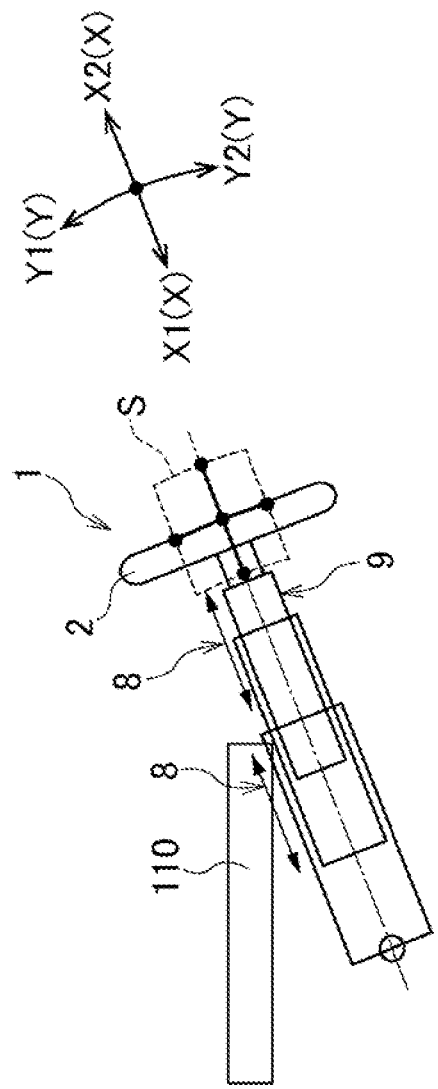
FIG. 30 is a schematic view of the electrically adjustable steering according to the modification.

The present application can be applied to an electrically adjustable steering having any type or structure as long as the electrically adjustable steering includes the steering mechanism in which the steering wheel is mounted on the driver seat side, the position adjustment mechanism including the electric motor that adjusts the telescopic position and the tilt position of the steering wheel, and the motor control unit that controls driving of the electric motor. For example, as shown in FIGS. 29 and 30, the electrically adjustable steering may include a plurality of electric telescopic mechanisms 8 that adjust the telescopic position of the steering wheel 2.

The invention claimed is:

1. An electrically adjustable steering comprising:
 a steering mechanism in which a steering wheel is mounted;
 a position adjustment mechanism which includes an electric motor configured to adjust a telescopic position and a tilt position of the steering wheel; and
 a motor control unit configured to control driving of the electric motor,
 wherein the position adjustment mechanism is configured to perform a storage operation of storing the steering wheel in a storage position to secure a space in a driver seat for a driver and an adjustment operation of adjusting the steering wheel to a position suitable for driving within an adjustment operation range,
 wherein the motor control unit is configured to drive the electric motor such that a speed of the steering wheel during the storage operation is higher than a speed of the steering wheel during the adjustment operation, and
 wherein the motor control unit is configured to determine the speed of the steering wheel during the storage operation based on a position of the steering wheel immediately before the storage operation.

2. The electrically adjustable steering according to claim 1,
 wherein the motor control unit is configured to drive the electric motor such that the speed of the steering wheel changes during the storage operation.

3. The electrically adjustable steering according to claim 2,
 wherein the motor control unit is configured to drive the electric motor such that a speed at a beginning during the storage operation is higher than a speed at a different point in time during the storage operation.

4. The electrically adjustable steering according to claim 1,
 wherein the position adjustment mechanism is configured to perform a return operation of returning the steering wheel from the storage position back to an inside of the adjustment operation range, and
 the motor control unit is configured to drive the electric motor such that a speed changes during the return operation.

5. The electrically adjustable steering according to claim 1,
 wherein the motor control unit is configured to drive the electric motor such that an upward movement operation of moving the steering wheel upward is included at a beginning of the storage operation.

6. The electrically adjustable steering according to claim 5,
 wherein the motor control unit is configured to drive the electric motor such that a speed of the upward movement operation at the beginning of the storage operation is higher than a speed at a different point in time during the storage operation.

7. The electrically adjustable steering according to claim 1,
 wherein the position adjustment mechanism is configured to perform a return operation of returning the steering wheel from the storage position back to an inside of the adjustment operation range, and
 the motor control unit is configured to drive the electric motor such that a final speed during the return operation is slower than a speed at a different point in time during the return operation.

8. The electrically adjustable steering according to claim 1,
 wherein the position adjustment mechanism is configured to perform a return operation of returning the steering wheel from the storage position back to an inside of the adjustment operation range, and
 the storage operation and the return operation are different from each other in (i) locus and/or (ii) speed.

9. The electrically adjustable steering according to claim 1
 wherein the position adjustment mechanism is configured to perform a return operation of returning the steering wheel from the storage position back to an inside of the adjustment operation range,
 the electrically adjustable steering further comprises a notification unit configured to notify status of the return operation during the return operation, and
 the notification unit is configured to notify through an image, light, sound, odor, or vibration.

10. The electrically adjustable steering according to claim 1,
   wherein the position adjustment mechanism performs the storage operation during automatic driving of a vehicle or when a driver enters or exits the vehicle.

\* \* \* \* \*